US012705947B2

(12) United States Patent
Kondo et al.

(10) Patent No.: US 12,705,947 B2
(45) Date of Patent: Aug. 11, 2026

(54) ARTICLE ACCOMMODATION DEVICE AND ARTICLE SUPPLY DEVICE

(71) Applicant: BANDAI CO., LTD., Tokyo (JP)

(72) Inventors: Hajime Kondo, Tokyo (JP); Tatsushi Ikarashi, Tokyo (JP); Nobuo Kurokawa, Tokyo (JP); Yoshihiro Murakami, Tokyo (JP)

(73) Assignee: BANDAI CO., LTD., Tokyo (JP)

( * ) Notice: Subject to any disclaimer, the term of this patent is extended or adjusted under 35 U.S.C. 154(b) by 359 days.

(21) Appl. No.: 18/550,676

(22) PCT Filed: Dec. 27, 2021

(86) PCT No.: PCT/JP2021/048627
§ 371 (c)(1),
(2) Date: Sep. 14, 2023

(87) PCT Pub. No.: WO2022/196031
PCT Pub. Date: Sep. 22, 2022

(65) Prior Publication Data
US 2024/0355166 A1 Oct. 24, 2024

(30) Foreign Application Priority Data
Mar. 15, 2021 (JP) ................................ 2021-041603

(51) Int. Cl.
*G07F 11/16* (2006.01)
*G07F 11/00* (2006.01)
*G07F 11/42* (2006.01)

(52) U.S. Cl.
CPC .............. *G07F 11/16* (2013.01); *G07F 11/00* (2013.01); *G07F 11/42* (2013.01)

(58) Field of Classification Search
CPC ....... G06Q 20/18; G07F 11/00; G07F 11/007; G07F 11/04; G07F 11/045; G07F 11/16;
(Continued)

(56) References Cited

U.S. PATENT DOCUMENTS

| | | | | |
|---|---|---|---|---|
| 7,178,717 B1 * | 2/2007 | Lindell | .............. | A47G 29/1209 70/160 |
| 7,428,806 B2 * | 9/2008 | Kim | ........................ | G07F 11/62 221/83 |

(Continued)

FOREIGN PATENT DOCUMENTS

| | | |
|---|---|---|
| CN | 104299319 A | 1/2015 |
| CN | 105705440 A | 6/2016 |

(Continued)

OTHER PUBLICATIONS

WIPO, International Search Report for International Application No. PCT/JP2021/048626, Mar. 1, 2022.

(Continued)

*Primary Examiner* — Babar Sarwar
(74) *Attorney, Agent, or Firm* — IMAIZUMI IP LAW, PLLC; Toshikatsu Imaizumi

(57) ABSTRACT

An article accommodation unit which can be attached to an article supply device, comprises a main body capable of accommodating articles in a state where the articles are laminated; an operation portion provided in the main body; and a lock portion provided in the main body and capable of locking the operation portion so as not to perform a certain operation, wherein the lock portion is configured so as to be able to release a lock of the operation portion on condition that the article accommodation unit is attached to the article supply device.

10 Claims, 12 Drawing Sheets

(58) Field of Classification Search
CPC .......... G07F 11/22; G07F 11/40; G07F 11/42; G07F 11/60; G07F 5/20; G07F 5/24
See application file for complete search history.

(56) References Cited

U.S. PATENT DOCUMENTS

| | | | | |
|---|---|---|---|---|
| 7,562,791 | B2 * | 7/2009 | Yuyama | G07F 11/04 221/265 |
| 9,251,641 | B2 * | 2/2016 | Kim | G07F 11/62 |
| 9,336,545 | B2 * | 5/2016 | Shimmerlik | B60P 3/0257 |
| 9,589,411 | B2 * | 3/2017 | Shimmerlik | G07F 11/04 |
| 10,832,511 | B2 * | 11/2020 | Shimmerlik | G07F 11/004 |
| 10,945,924 | B2 * | 3/2021 | Gross | G07F 17/0092 |
| 12,387,549 | B1 * | 8/2025 | Steinbauer | G07F 9/009 |
| 2006/0113314 | A1 * | 6/2006 | Yuyama | G07F 11/16 221/222 |
| 2007/0116792 | A1 * | 5/2007 | Yuyama | G07F 17/0092 425/193 |
| 2007/0129844 | A1 * | 6/2007 | Kim | B65B 5/103 700/231 |
| 2008/0099499 | A1 * | 5/2008 | Kim | G07F 11/54 221/82 |
| 2011/0170655 | A1 * | 7/2011 | Yuyama | A61J 7/02 702/155 |
| 2011/0309101 | A1 * | 12/2011 | Kokie | B65B 5/103 221/30 |
| 2012/0239186 | A1 * | 9/2012 | Kim | G07F 11/62 700/232 |
| 2013/0233894 | A1 * | 9/2013 | Kim | A61J 1/03 222/370 |
| 2013/0267927 | A1 * | 10/2013 | Omura | A61J 3/10 604/403 |
| 2014/0014678 | A1 * | 1/2014 | Yuyama | B65D 83/0409 221/277 |
| 2014/0203034 | A1 * | 7/2014 | Bae | G07F 17/0092 221/195 |
| 2014/0203036 | A1 * | 7/2014 | Bae | A61J 1/03 221/277 |
| 2015/0371482 | A1 | 12/2015 | Szpak et al. | |
| 2016/0213572 | A1 * | 7/2016 | Tahahama | B65B 35/08 |
| 2016/0220447 | A1 * | 8/2016 | Yoshinori | B65B 5/103 |

FOREIGN PATENT DOCUMENTS

| | | | | | |
|---|---|---|---|---|---|
| CN | 107103689 | A | | 8/2017 | |
| CN | 107492195 | A | * | 12/2017 | G07F 11/00 |
| CN | 107945375 | A | * | 4/2018 | G07F 9/10 |
| CN | 112150705 | A | | 12/2020 | |
| DE | 593694 | C | | 3/1934 | |
| DE | 202004018542 | U1 | | 4/2006 | |
| EP | 0090068 | A1 | * | 10/1983 | G07F 11/045 |
| EP | 0385234 | A2 | * | 9/1990 | G07B 3/04 |
| EP | 2500878 | A1 | * | 9/2012 | G07F 11/005 |
| FR | 2382062 | A1 | | 9/1978 | |
| JP | S60-25069 | U | | 2/1985 | |
| JP | S60-123995 | A | | 7/1985 | |
| JP | H04-160496 | A | | 6/1992 | |
| JP | H08-329330 | A | | 12/1996 | |
| JP | 3113693 | U | | 9/2005 | |
| JP | 2008027226 | A | | 2/2008 | |
| JP | 4392762 | B2 | | 1/2010 | |
| JP | 2011-18259 | A | | 1/2011 | |
| JP | 4684362 | B1 | | 5/2011 | |
| JP | 2019-185628 | A | | 10/2019 | |
| KR | 200444677 | Y1 | * | 5/2009 | G07F 5/24 |

OTHER PUBLICATIONS

WIPO, Written Opinion for International Application No. PCT/JP2021/048626, Mar. 1, 2022.

WIPO, International Search Report for International Application No. PCT/JP2021/048627, Mar. 8, 2022.

WIPO, Written Opinion for International Application No. PCT/JP2021/048627, Mar. 8, 2022.

Japan Patent Office(JPO), Office Action for Patent Application No. 2021-041603, Sep. 2, 2022.

European Patent Office(EPO), Supplementary European Search Report for European Patent Application No. 21931772.4, May 21, 2024.

European Patent Office(EPO), European Search Opinion for European Patent Application No. 21931772.4, May 21, 2024.

European Patent Office(EPO), European Search Report for European Patent Application No. 21931773.4, May 16, 2024.

European Patent Office(EPO), European Search Opinion for European Patent Application No. 21931773.4, May 16, 2024.

China National Intellectual Property Administration (CNIPA), Chinese First Search Report for Chinese Patent Application 202180090778.4, May 27, 2025.

China National Intellectual Property Administration (CNIPA), Chinese Supplementary Search Report for Chinese Patent Application 202180090778.4, Oct. 15, 2025.

China National Intellectual Property Administration (CNIPA), Chinese First Office Action for Chinese Patent Application 202180090778.4, May 27, 2025.

China National Intellectual Property Administration (CNIPA), Chinese Second Office Action for Chinese Patent Application 202180090778.4, Oct. 15, 2025.

* cited by examiner

FIG. 12A
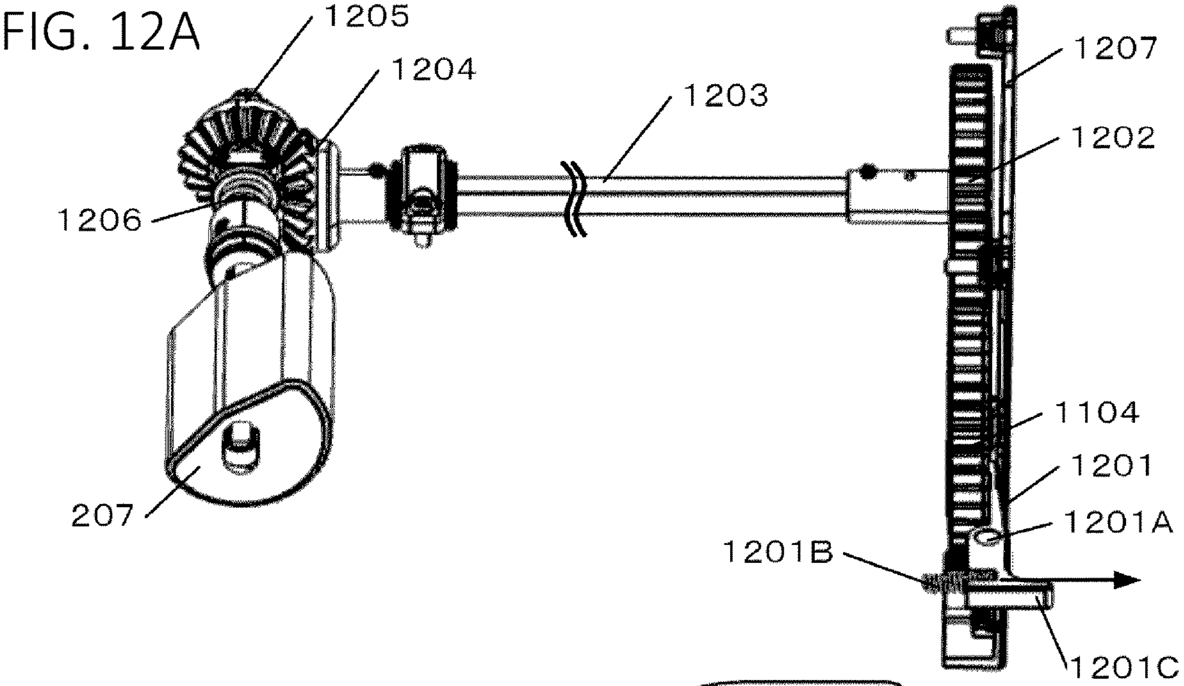
FIG. 12B
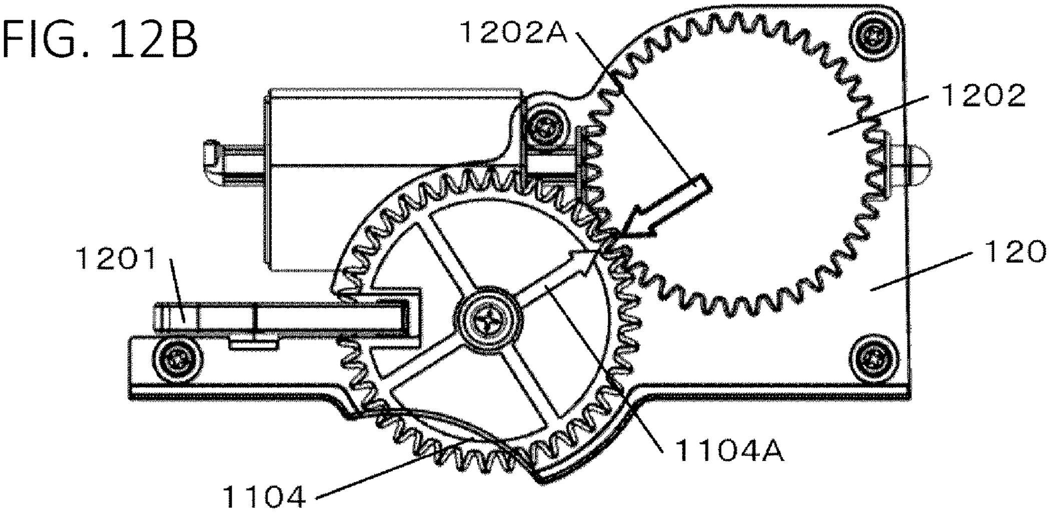
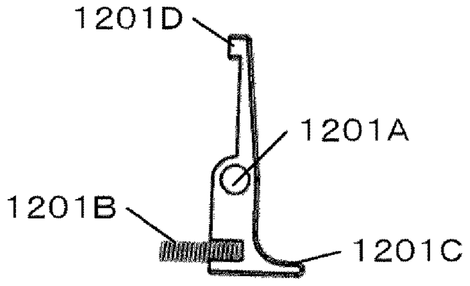
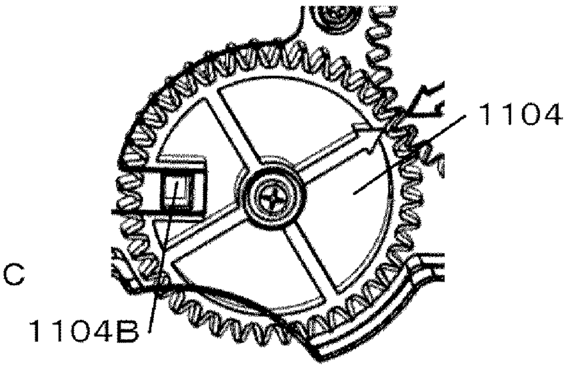
FIG. 12C
FIG. 12D

ARTICLE ACCOMMODATION DEVICE AND ARTICLE SUPPLY DEVICE

TECHNICAL FIELD

The present invention relates to an article accommodation device and an article supply device.

BACKGROUND

There is a device for supplying an article according to payment of consideration. Patent Document 1 discloses an article supply device capable of supplying an article according to payment of consideration.

PRIOR ART

Patent Documents

[Patent Document 1] Japanese Patent Application Publication No. 2008-27226

SUMMARY

Technical Problem

However, in Patent Document 1, an article(s) to be supplied is not sheet-shaped or case-shaped. On the other hand, there is a demand for a configuration in which a sheet shaped or case shaped article is made suppliable by accommodating such articles and attaching it to an article supply device.

Therefore, provided herein are an article accommodation unit which has a configuration capable of supplying a sheet-shaped or case shaped article etc. and which can be attached to an article supply device, and an article supply device to which the article accommodation unit is attached.

Solution to Problem

One of the aspects of the present invention is an article accommodation device which can be attached to an article supply device, and which comprises a main body capable of accommodating articles in a state where the articles are laminated; an operation portion provided in the main body; and a lock portion provided in the main body and capable of locking the operation portion so as not to perform a certain operation, wherein the lock portion is configured so as to release a lock of the operation portion on condition that the article accommodation unit is attached to the article supply device.

Still another aspect of the present invention is an article supply device, which comprises the article accommodation unit and a reception unit which receives payment of consideration for the article, a detection portion which detects the payment of consideration, an operation portion which accepts an operation for transporting the article accommodated in the article accommodation unit in response to a detection of the payment of consideration, and a power transmission unit for transmitting a power of the operation to the transportation unit, and transporting the article.

Advantageous Effect of Invention

It is possible to provide an article accommodation unit which is configured to supply a sheet or a case etc. as an article, and which can be attached to an article supply device, and an article supply device to which the article accommodation unit is attached.

BRIEF DESCRIPTION OF DRAWINGS

FIGS. 8A, 8B and 8C illustrate an interlocking structure between a notice of the presence of an article in a switch 204 and a notification in a notification portion 108, according to an embodiment, respectively;

FIGS. 12A to 12D illustrate a power transmission mechanism on a side of an article accommodation unit 11 for transmitting a power corresponding to an operation to the handle 104 according to an embodiment, respectively.

DETAILED DESCRIPTION

Figure 1A:
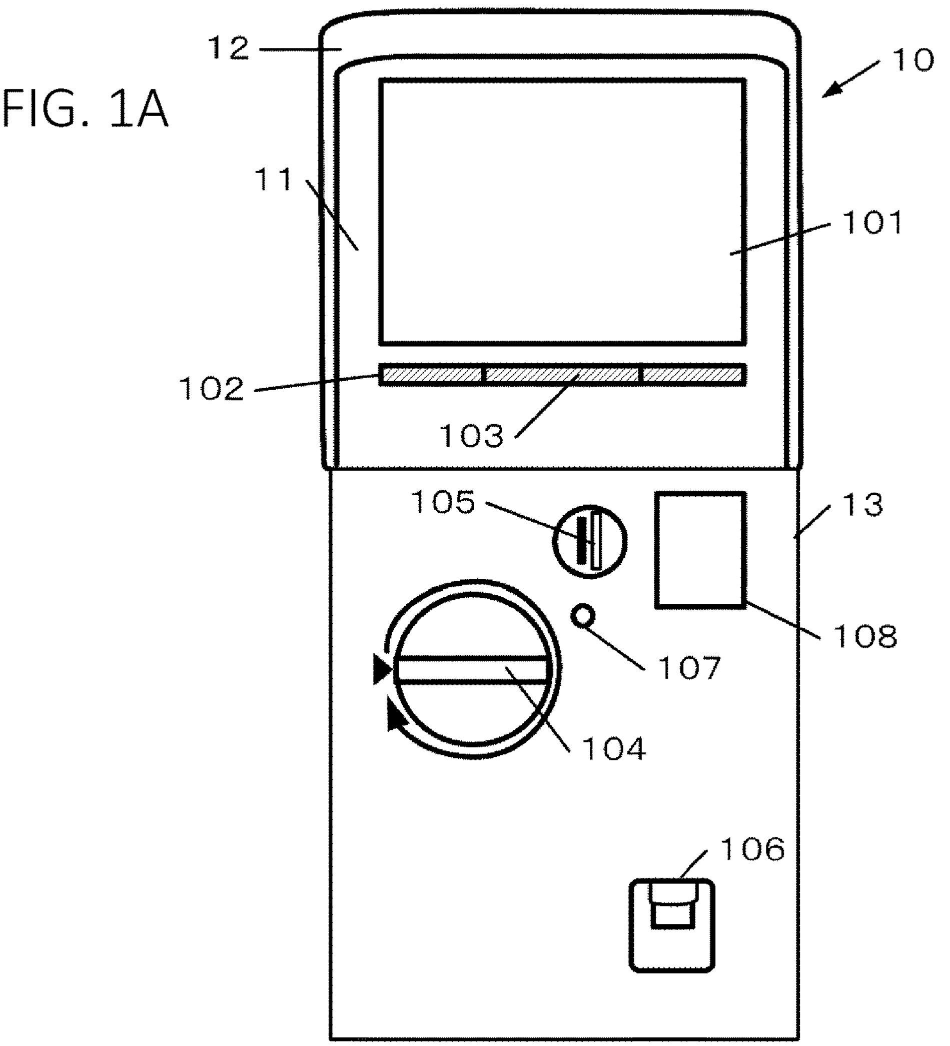
FIGS. 1A and 1B show an example of a configuration of an article supply device 10 and a hardware configuration of the article supply device 10 according to an embodiment, respectively.

An embodiment will be explained below in detail, referring to attached drawings. It should be noted that the embodiments set forth below do not limit the claimed invention and all the combinations of features explained in the embodiments may not be necessarily essential to the present invention. Two or more features among a plurality of the features explained in the embodiments may be arbitrarily combined with each other. The same reference numbers are assigned to similar structures or the same structures and duplicate explanation thereof will be omitted A configuration of an article supply device 10 will be described referring to FIG. 1A. FIG. 1A is a front view of the appearance of an example of the article supply device 10 corresponding to the embodiment. In FIG. 1A, the main body of the article supply device 10 comprises a front wall, rear wall and side walls, an article accommodation unit 11 (which is also referred to as an article accommodation device or an article holding device) is a container (or a bucket or a case etc.) in which articles to be supplied to a user by the article supply device 10 are accommodated and the article accommodation device 11 is attached to the article supply device 10. The article accommodation unit 11 may be attached to the article supply device 10 by sliding it from a front side of the article supply device 10 toward the rear side thereof, along a prescribed rail arranged inside a cover portion 12. In addition, the article accommodation unit 11 can be removed from the article supply device 10 by pulling out the article accommodation unit 11 from the article supply device 10 along the rail. The rear wall of the article accommodation unit 11 and a rear wall of the article supply device 10 may be configured so as not to be brought in contact with each other at the time of attachment thereof.

The article accommodation unit 11 is made of plastic. A region 101, on which information relating to articles to be supplied can be presented, is provided, on a front face thereof. The accommodation unit 11 may be configured so that the articles accommodated thereinside can be viewed or cannot be viewed from the outside. The articles, such as sheets, printed matters, cards, CDROM case etc., can be are laminated and accommodated inside the article accommodation unit 11. A supply port 102 of an article is provided in the article accommodation unit 11, and a shutter 103 is provided on the supply port (opening/closing door) so as to prevent injustice access to the inside of the article accommodation unit 11 from the supply port 102.

The article accommodation unit 11 is provided on an upper side of the main body 13. A handle 104, a cash input port 105, a cash return port 106, a cash return button 107, and a notification portion 108 for issuing a notification that there is no article in the article accommodation unit 11, are provided on a front face of the main body 13.

The handle 104 is an operation member which is configured so as to be rotatable in a direction shown in an arrow according to a payment of consideration. When a user rotates the handle 104, the shutter 103 is opened, and an article located at a lowest position, among articles accommodated in the article accommodation unit 11, is supplied from the supply port 102. The rotation of the handle 104 is limited in a state where a payment of the consideration cannot be confirmed. When the payment of the consideration is confirmed, the lock mechanism is released so that the handle 104 becomes rotatable.

The cash input port 105 is used for feeding coins when the consideration is paid in cash. Two or more kinds of input ports may be provided depending on the sizes of coins. For example, input ports having sizes capable of respectively receiving five-hundred-yen coins and hundred-yen coins may be provided. In FIG. 1, a common input port for five-hundred-yen coins and the hundred-yen coins is provided, and the input port corresponding to the size of the hundred-yen coins is sealed (closed).

The cash input port 105 can be switched between a state where an input of cash is accepted and a state where it is not accepted, by controlling a mechanism thereinside. Specifically, the article accommodation unit 11 may have a mechanism for detecting the presence of an article. When it does not detect the presence of any article, the input port may be closed so as not to receive any coins. When the inside of the article accommodation unit 11 cannot be visually recognized from the outside, it is possible to prevent coins from being inputted even though there is no article therein.

In the cash input portion 105, a depression portion having a curved face is formed and an input port is formed near the bottom of the depression (the deepest part). By this configuration, even a small child may easily feed coins in the cash input port 105 by sliding the coin and tracing the curved face. The cash return port 106 is configured so as to return the fed coins according to an operation performed to the cash return button 107 so that the user can take out the returned coins from the device.

Figure 1B:
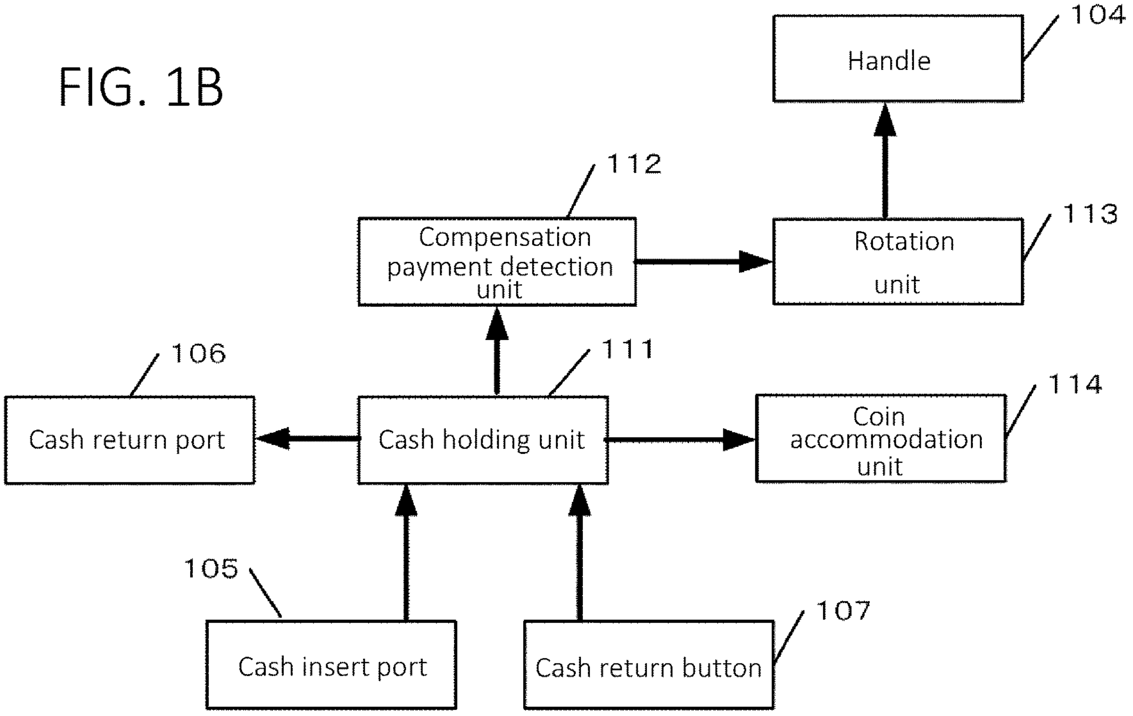

FIG. 1B shows a block function diagram of a hardware mechanism (which may partially include software) in the article supply device 10. Coins inputted from the cash input port 105 are held in a cash holding unit 111, and the consideration payment detection portion 112 determines whether or not it reaches a predetermined amount. When the consideration payment detection portion 112 determines that it reaches a predetermined amount, a lock of the rotation unit 113 connected to the handle 104 is released so that the handle 104 becomes rotatable. Thus, the handle 104 can be rotated thereby. When the rotation unit 113 is rotated, the coins held in the cash holding unit 111 are discharged into a coin accommodation unit 114, and the rotation unit 113 is locked again. In addition, when the cash return button 107 is operated, the cash held in the cash holding unit 111 is returned from the cash return port 106.

When there is no article in the article accommodation unit 11, the notification portion 108 notifies of it. In response to the result of detection performed by the detection portion for detecting whether or not there is an article in the article accommodation unit 11, when there is no article therein, the notification portion 108 issues, to the outside, a visually recognizable notification to the effect that there is no article.

Although in explanation of positional relations of the respective parts in the present specification, terms, front (front side), rear (rear side), left (left side), right (right side), upper (upper side), low (lower side) etc. are used, these terms indicate relative positions, when the article supply device 10 is regarded as the standard. For example, front corresponds to a front face side of the article supply device 10, and rear corresponds to a back face side of the article supply device 10. In addition, right left up and down indicate right left up and down with respect to the article supply device 10 shown in FIG. 1A.

Next, a configuration of the article accommodation unit 11 according to the present embodiment will be described referring to FIGS. 2A and 2B. The article accommodation unit 11 includes the main body in an approximately rectangular parallelepiped shape, which comprises an exterior wall portion 200 forming a circumferential portion of the article accommodation unit 11, and the placing unit 201 on which an article is placed. An upper face of the placing unit 201 and a lower end face of the supply port 102 form the same plan as each other. In addition, the placing unit 201 divides an inner space of the article accommodation unit 11 into a first space located on an upper side of the placing unit 201 and a second space located on a lower side of the placing unit 201. Articles placed on the placing unit 201 inside the he first space may have various sizes. The shape of the articles is an approximately rectangular parallelepiped shape and the size thereof may be identified by width x length x height. The width, the length and the height respectively correspond to amplitudes of X axis, Y axis and Z axis of a coordinate system shown in FIG. 2A. The articles may be, for example, ones having a thickness such as CD ROM cases DVD cases in addition to name card size to A4 size sheets or cards.

A first holding portion 202L and 202R and a second holding portion 203 are disposed in the first space, in order that various sizes of articles can be discharged. The first holding portion 202L and 202R support articles from a side thereof in the width direction of the articles, can be moved in the width direction (X axis) along the rails formed on the placing unit 201, so that a distance (W1) between the first holding portion 202L and 202R may be adjusted so as to be the size corresponding to the width of the article. The first holding portions 202L and 202R are movable on the rails along the width direction of the depressing portion 205, and the first holding portions 202L and 202R are configured to be movable in directions where they come close to each other or separate from each other. The second holding portion 203 supports the articles from a side thereof in a depth direction of the articles, and can be moved in the depth direction (Y axis) along rail(s) formed on the placing unit 201, so that a distance (L1) between the second holding portion 203 and a position where a tip portion of the articles on a side of the article supply port 102 is located may be set to the size corresponding to the length of the article. Here, the moving range of the second holding portion 203 on the rail(s) is larger than that of the first holding portion 202 on the rails.

Next, the switch 204 is a detection portion for detecting whether or not there is any article(s) in the article accommodation unit 11. When there is an article(s) therein, the detection is performed since the article presses it downward. Here, the article(s) is depressed downward by the depressing portion 205 and is held, so that even if only single sheet article remains, the depressing force from the depressing portion 205 is transmitted to the switch 204 through the single article, whereby the presence of the article can be detected. On the other hand, since the switch 204 is not directly depressed by the depressing portion 205, the switch 204 is not depressed so that it is possible to detect that there is no article, when there is no article.

The depressing portion 205 is movable in a downward direction due to its own weight and depresses, in the downward direction, a tip portion (a front portion) of the article(s) on an article supply port 102 side thereof held by the first holding portion 202 and the second holding portion 203. The depressing portion 205 is configured so as to be detachable from the main body through rails 208 described later. A guide portion 206 functions to guide an article accommodated in the article accommodation unit 11 when the article is sent out to the outside. The guide portion 206 adjusts the height from the placing unit 201 according to the height of a single article so as to discharge only the single article through the article discharge path from the supply port 102.

Figure 2A:
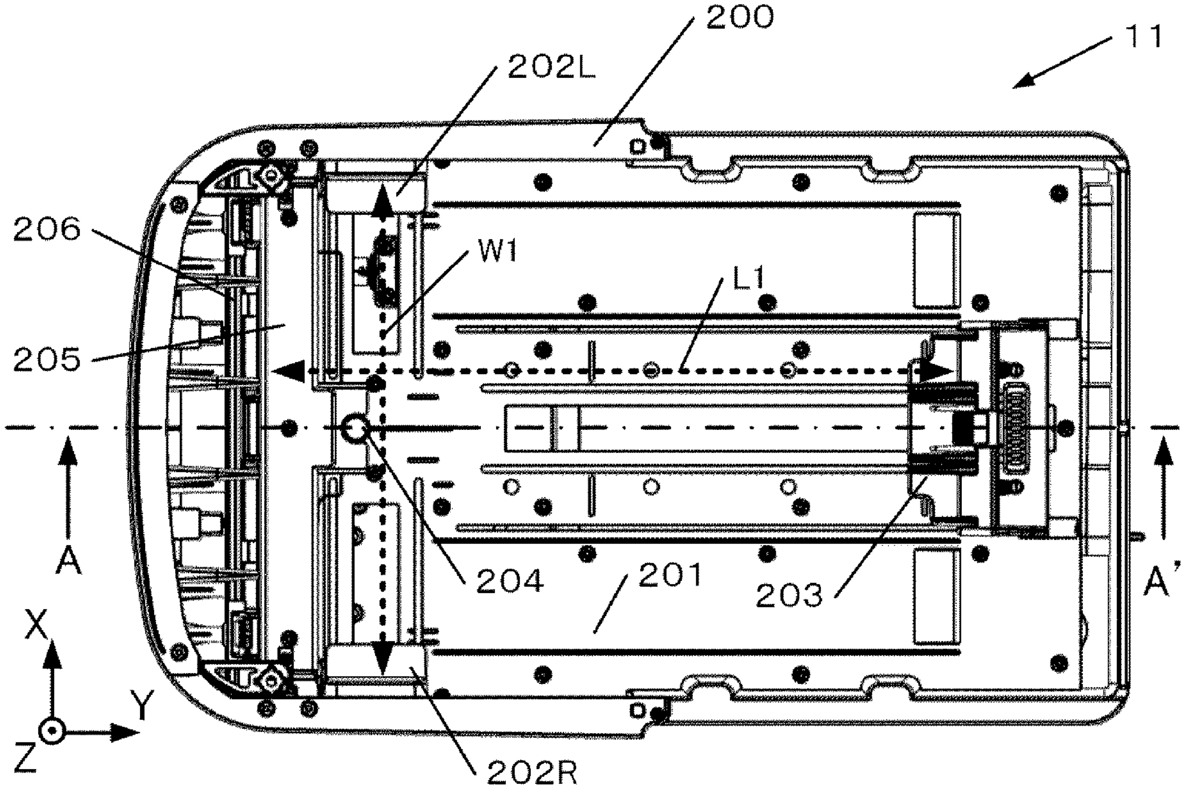
FIGS. 2A and 2B show an example of a configuration of an article accommodation unit 11 according to an embodiment, respectively.
Figure 2B:
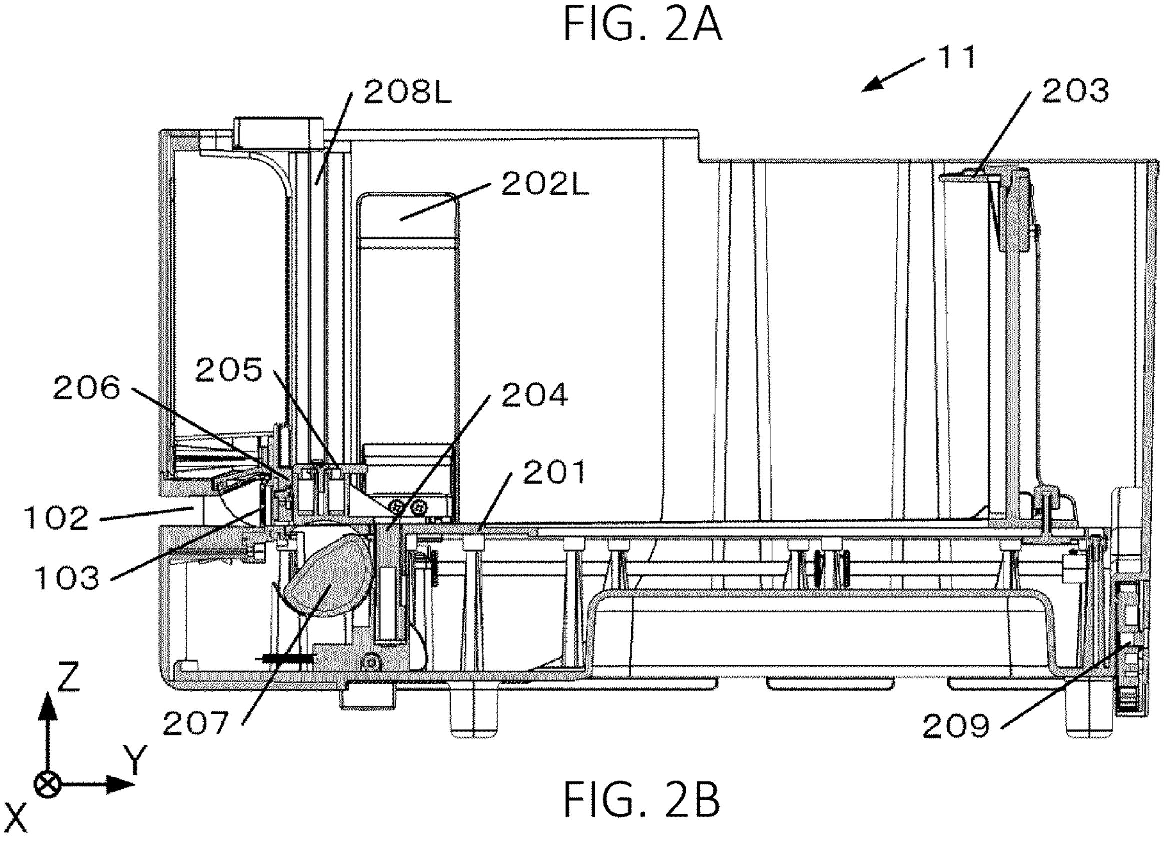

FIG. 2B is in a cross-sectional view of an example of the structure of the article accommodation unit 11, taken along a line A-A' shown in FIG. 2A. The structural elements 201 to 206 are the same as those explained referring to FIG. 2A. In FIG. 2B, the height of the first holding portion 202 and that of the second holding unit 203 approximately coincide with each other, and the laminated amount of the articles which can be accommodated in the article accommodation unit 11 is determined according to a volume specified by the first holding portion 202 and the second holding unit 203. A roller 207 for discharging the article and part of a transfer mechanism for transferring a turning force of the handle 104 to a roller 207 are arranged on a lower side of the placing unit 201 for placing an article in the second space of the article accommodation unit 11.

The roller 207 is provided near the center in the width direction of the article accommodation unit 11 (or depressing portion 205), and is interlocked with the handle 104 so that the roller 207 is rotated when the handle 104 is rotated. Slip resistance such as rubber is formed on the surface of the roller 207. A cross section of the roller 207 has a circular cylindrical shape with a cut-out. By the cut-out, only one article can be discharged by one rotation of the handle. If the roller is formed in a perfect circular cylindrical shape, the articles are discharged in series. Therefore, such a cut-out is formed so that only one article is discharged. In addition, according to the rotation of the roller 207, the shutter 103 is operated so as to be opened toward the outside of the article accommodation unit 11. By this, only when the roller 207 is rotated, the shutter 103 is opened so that the article is supplied.

In addition, the shutter 103 is configured so that two or more opening/closing doors are arranged in the width direction of the article accommodation unit 11, and at least one of the opening/closing doors is opened when such an article is supplied. According to the present embodiment, the shutter 103 may be configured by first through third opening/closing doors. Only the second opening/closing door may be opened according to the width of the article, or all the three opening/closing doors may be opened. The rail 208 is a rail member for restricting movements of the depressing portion 205 in upper and lower direction so that the depressing portion 205 accurately depress the article.

An operation portion 209 transfers a turning force of the handle 104 to the roller 207, and at least part of the operation portion 209 is projected from a bottom portion of the article accommodation unit 11 toward a lower side so as to be connected to the mechanism for transmitting the turning force of the handle 104 provided on the main body 13, which is located on a lower side of the article accommodation unit 11.

Figure 3A:
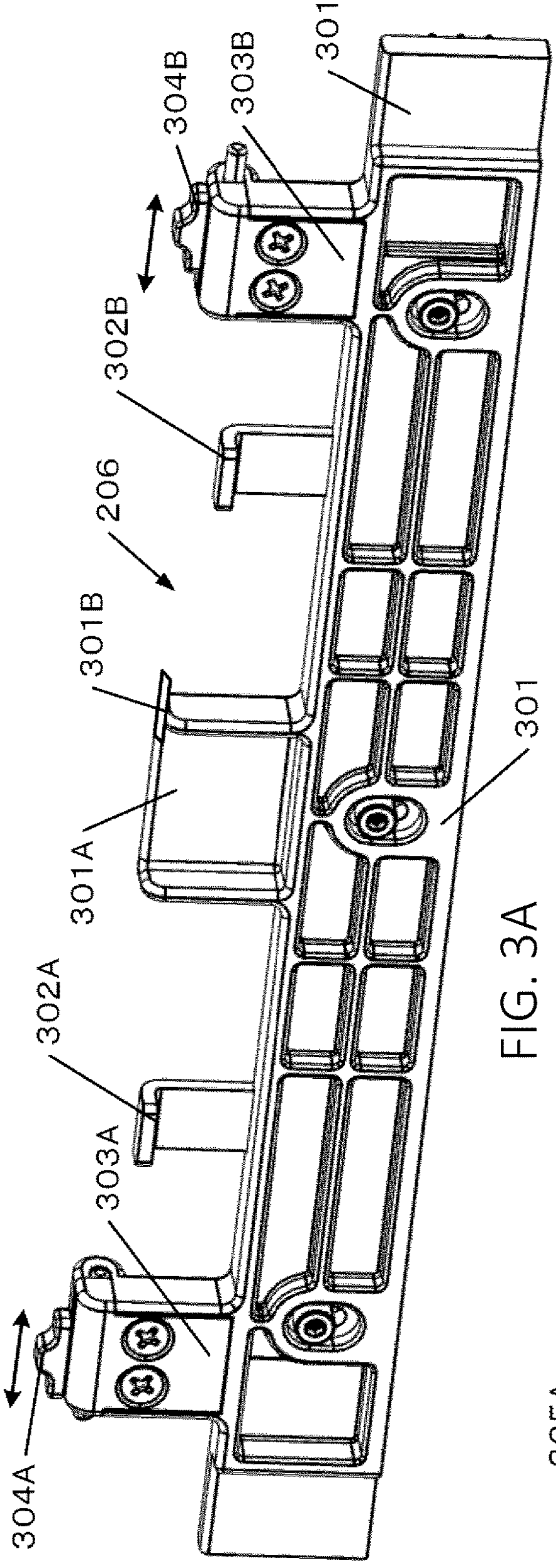
FIGS. 3A and 3B illustrate a configuration of a guide portion 206 and a support member 305 according to an embodiment, respectively.

Next, the structure of the guide portion 206 will be explained referring to FIGS. 3A and 3B. FIG. 3A is a diagram showing an example of the outer structure of the guide portion 206. A reinforce member 302 is attached to a main member 301 of the guide portion 206, and engages with a support member 305 shown in FIG. 3B, and the height of the guide member 206 from the placing unit 201 is determined. The guide portion 206 is arranged so as to be attachable to and detachable from the article accommodation unit 11 through the support member 305. A holding portion 301A for holding the guide portion 206 is provided approximately at a center of the main member 301, and an indication portion 301B for identifying the position of the guide portion 206 is provided at an end of the holding portion 301. The indication portion 301B functions so as to indicate the current position of the guide portion 206 with respect to a scale indicating the position of the guide portion 206 arranged in the article accommodation unit 11. A first engaging portion 304A for engaging with the support member 305 is arranged near one end of the guide portion 206, and a second engaging portion 304B is arranged near the other end of the guide portion 206.

A bottom face of the guide portion 206 coincides with a bottom face of the main member 301, and when the guide portion 206 is arranged in the article accommodation unit 11, this bottom face becomes approximately parallel to the upper face of the placing unit 201. The guide portion 206 may be made of, for example, plastic. In such case, a reinforce member 302 may be made of metal (for example, metal or other metal). The holding portions 302A and 302B form part of the reinforce member 302, and are used for holding it when the height of the guide portion 206 is adjusted.

The member 303A and 303B are used for respectively attaching the first engaging portion 304A and the second engaging portion 304B to the main member 301. The first engaging portion 304A and the second engaging portion 304B are arranged slidably in an arrow direction (a longitudinal direction of the guide portion 206 and a width direction of the article accommodation unit 11) in a space formed between the main member 301 and the members 303A and 303B. The first engaging portion 304A and the second engaging portion 304B respectively have projections in the sliding directions (left and right directions), and engage with two or more steps of recesses (engaged portion or depressed portions) formed on the support member 305 so that the guide portion 206 is supported at a predetermined height.

Figure 3B:
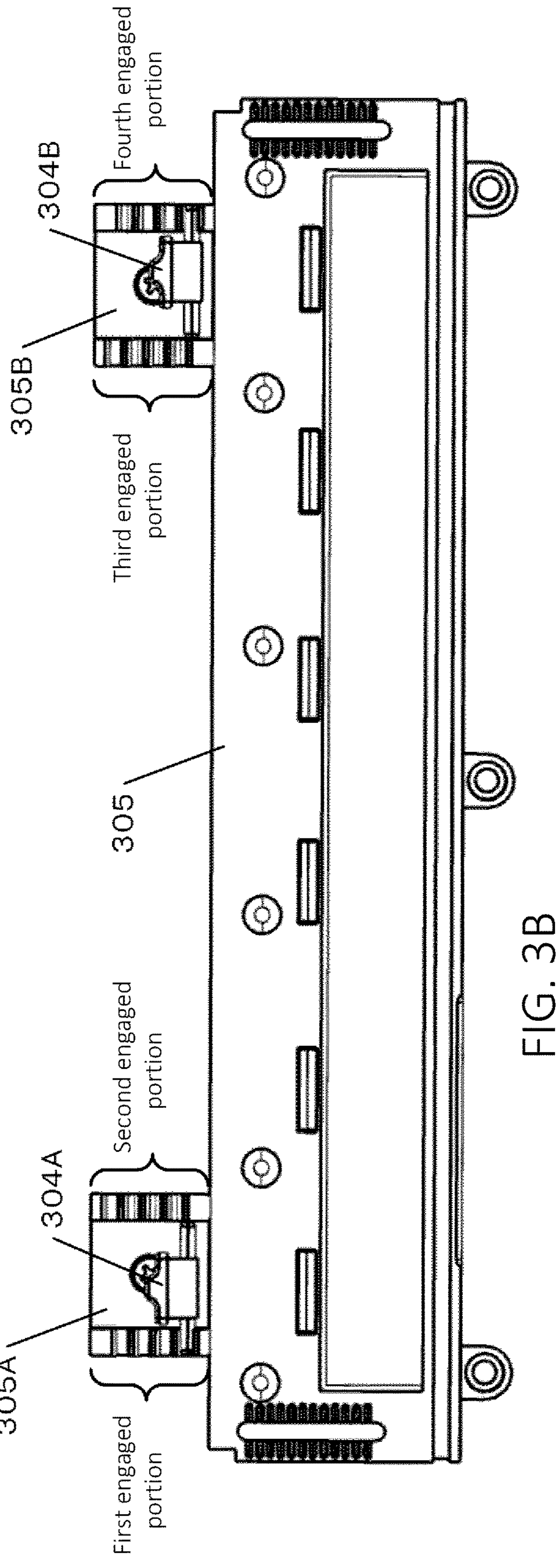

FIG. 3B is a diagram showing an example of the structure of the support member 305. The support member 305 is configured to have a first support member 305A and a second support member 305B. The first support member 305A and the second support member 305B respectively have recesses formed at both left and right ends thereof on their front sides. The distances from the respective recesses to the bottom face of the support member 305 or to an upper face of the placing unit 201 at time when being accommodated in the article accommodation unit 11 are different from each other. When being accommodated in the article accommodation unit 11, the support member 305 has a first face which faces a region 101 of the article accommodation unit 11 or the supply port 102, and a second face on the other side. The recesses of first support portion 305A and those of the second support portion 305B are formed on the second face. That is, FIG. 3B mainly shows the structure on a side of the second face of the support member 305. Similarly, FIG. 3A also shows the structure of the guide portion 206 on the side of the second face.

The first support portion 305A has a first engaged portion and a second engaged portion comprising two or more steps of recesses, and the second support portion 305B has a third engaged portion and a fourth engaged portion. The first to fourth engaged portions respectively comprises recesses whose number is the same as one another (for example, four steps), and the heights of the respective recesses of the first engaged portion and those of the fourth engaged portion (from the bottom face 306 of the support member 305 or the upper face of the placing unit 201 when being arranged in the article accommodation unit 11), coincide with each other, and the heights of the respective recesses of the second engaged portion and those of the third engaged portion coincide with each other. That is, the height position of the lowest step recess of the first engaged portion and that of the fourth engaged portion coincide with each other, and similarly the height position of the highest step recess of the second engaged portion and that of the third engaged portion coincide with each other. In addition, the height position of the lowest step recess of the second engaged portion and that of the third engaged portion coincide with each other, and similarly the height position of the highest step recess of the second engaged portion and that of the third engaged portion coincide with each other.

FIG. 3B shows an example of arrangement of the first engaging portion 304A and the second engaging portion 304B. Here, the first engaging portion 304A engages with the lowest step of the first engaged portion and the second engaging portion 304B engages with the lowest step of the fourth engaged portion so that the position of the bottom face of the guide portion 206 is lowest, so as to be responsive to case where the single article is the thinnest. Since the number of steps which respectively form pairs is predetermined, when one of engaging portions engages with the first engaged portion (or fourth engaging portion) in a certain step, the other engaging portion engages with the fourth engaged portion (or first engaged portion) in a corresponding step. Similarly, one of the engaging portion engages the second engaged portion (or the third engaged portion) in a certain step, the other engaging portion engages with the third engaged portion (or the second engaged portion) in a corresponding step. Compared with the case where only the first engaged portion and the fourth engaged portions are provided (or only the second engaged portion and the third engaged portion are provided), it is possible to more precisely set the height thereof when the second engaged portion and the third engaged portions (or the first engaged portion and the fourth engaged portions) are additionally provided.

In this way, the first engaging portion 304A and the second engaging portion 304B are slid in a width direction of the article accommodation unit 11 (a longitudinal direction of the guide portion 206, a width direction of an article) for engagement, that is, for example, the first engaging portion 304A is slid in a first longitudinal direction (leftward) so as to engage with the first engaged portion and the second engaging portion 304B is slid in a second longitudinal direction (rightward) which is a direction opposite to the first longitudinal direction so as to engage with the fourth engaged portion, or the first engaging portion 304A is slid in the second longitudinal direction (rightward) so as to engage with the second engaged portion and the second engaging portion 304B is slid in the first longitudinal direction (leftward) so as to engage with the third engaged portion, so that it is possible to cope with an arbitrary height of an article(s). The first engaging portion 304A can engage with an engaged portion, that is, either the first engaged portion or the second engaged portion, by sliding the first engaging portion 304A, and the second engaging portion 304A can engage with an engaged portion, that is, either the third engaged portion or the fourth engaged portion by sliding the first engaging portion 304A.

Figure 4C:
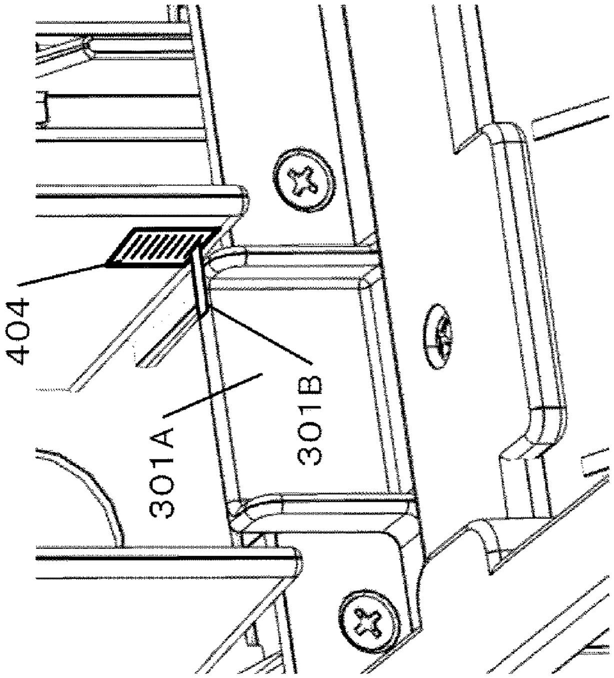
FIGS. 4A, 4B and 4C illustrate a configuration of a guide portion 206 and a support member 305 according to an embodiment, respectively.
Figure 4A:
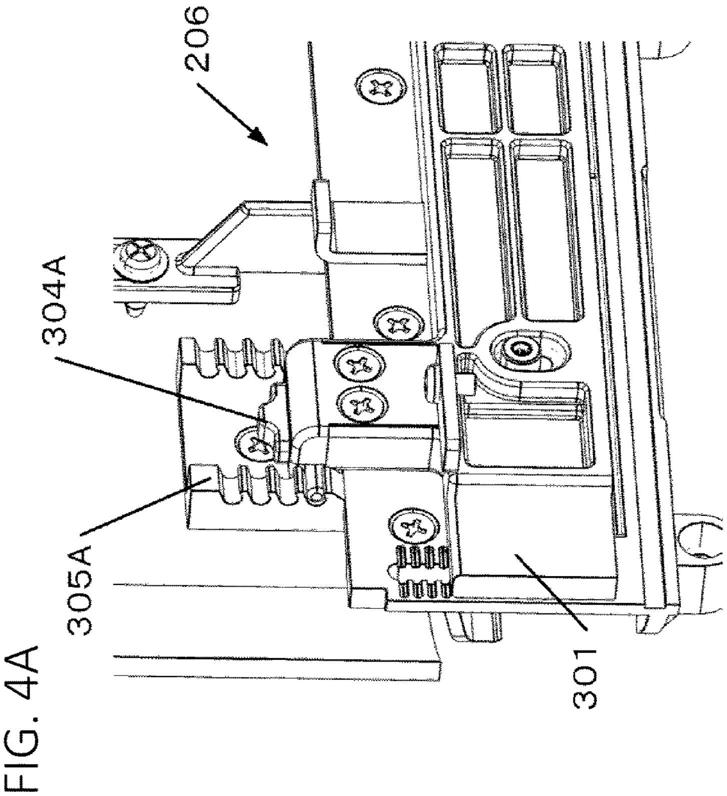
Figure 4B:
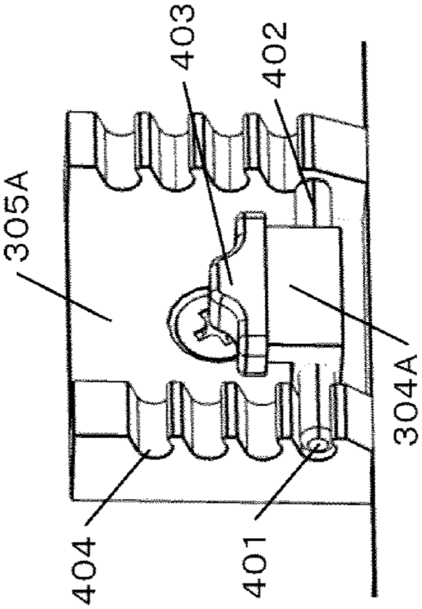

FIG. 4A shows a state where the first engaging portion 304A and the first support portion 305A are engaged with each other. The article accommodation unit 11 is configured so that each engaging portion and each support portion are engaged with each other in a state where the guide portion 206 is brought into contact with the support member 305. As shown in FIG. 4A, the first engaging portion 304A engages with a lowest step recess of the first engaged portion. FIG. 4B is a diagram showing an enlarged view of the first engaging portion 304A and the first support portion 305A in a state where they are engaged with each other. As shown in FIG. 4B, the first engaging portion 304A has circular cylindrical shaped projections 401 and 402 on left and right sides thereof and a convex operation portion 403 is formed at the apex thereof. The shape of the first engaging portion 304A and that of the second engaging portion 304B are not limited to those shown in FIG. 4B as long as they have projections in a circular cylindrical shape in at least part thereof. A user can slide each engaging portion by operating the operation portion 403. Each of the engaged portions (recesses) 404 formed on the first support portion 305A is formed to so as to be C-shaped or inclined U-shaped, and is configured so as to be open on the second face side of the support member 305.

FIG. 4C is a diagram showing a relation between the operation portion 301B provided in the holding portion 301A of the main member 301 and the scale portion 404. A scale corresponding to positions of the guide portion 206 which correspond to the respective steps of the first through fourth engaged portions is formed so that it is possible to specify the current step of the engaged portion from the position indicated by the indication portion 301B. In addition to the lines indicating the positions, numerical values indicating the steps may be associated therewith and formed.

Or, numerical values for indicating the height of the guide portion 206 or numerical values for indicating the height or size of an article are formed on the scale portion 404.

Figure 5:
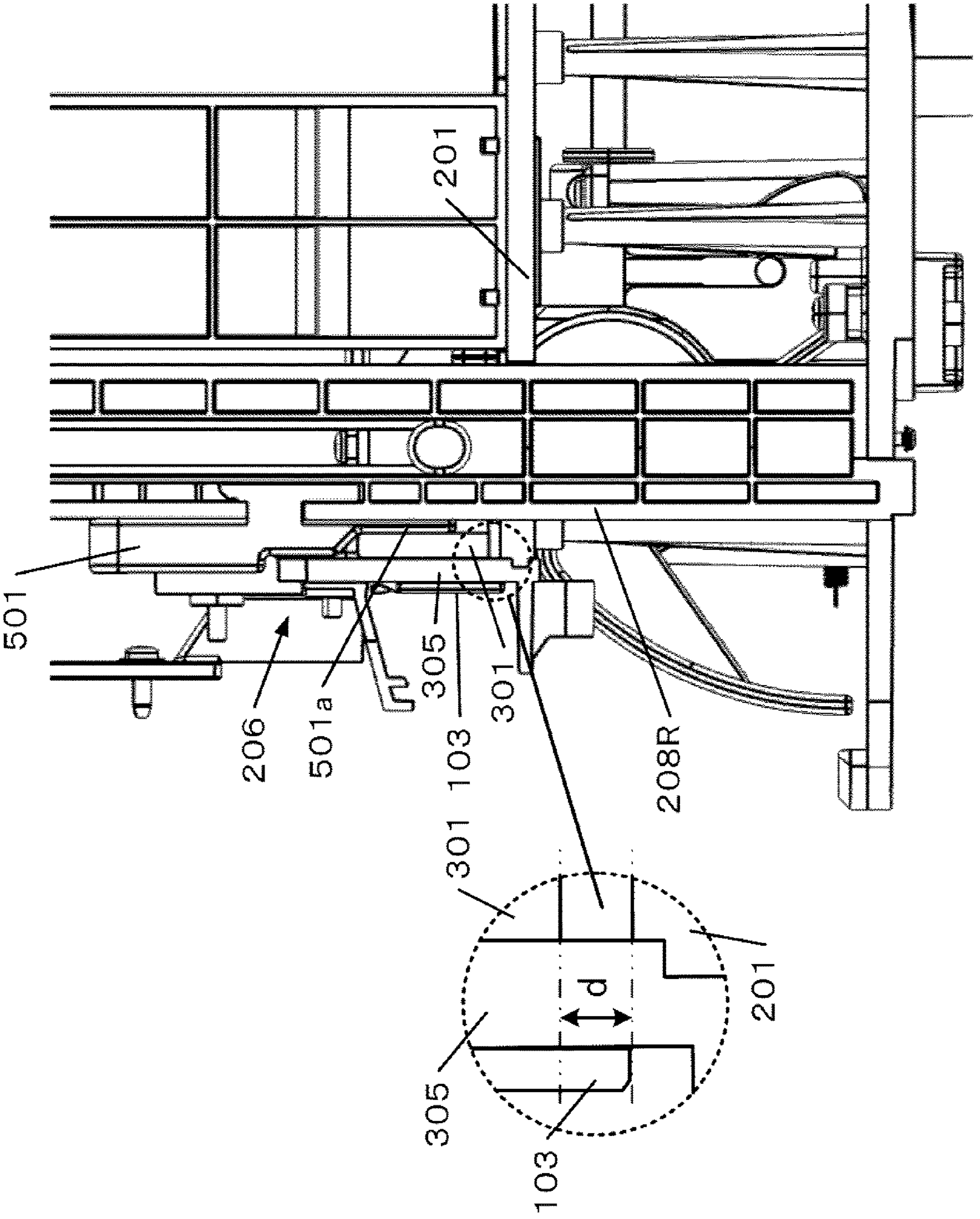
FIG. 5 is a diagram of a structure around the guide portion 206 according to an embodiment, which is viewed from a right face side of the article accommodation unit 11.

Next, FIG. 5 is a diagram showing the structure around the guide portion 206, which is viewed from a side of a right side face of the article accommodation unit 11. The position of the guide portion 206 is fixed by inserting a tip portion 501*a* of a fixing member 501 in a gap between an end portion of the main member 301 and a rail 208R. When the height of the guide portion 206 from the upper face of the placing unit 201 is adjusted, it is necessary to do it after the fixing member 501 is detached. A slant is formed on the side of the fixing member 501 to which the tip portion 501*a* is attached, thereby preventing deviation of the tip portion of the main member 301. FIG. 5 shows only the structure on the right side face thereof, and the position of the left side end portion of the main member 301 may be fixed by a similar structure.

In FIG. 5, a portion enclosed in a dot-line circle indicates a distance d from the upper face of the placing unit 201 of the guide 206 (the main member 301), wherein the distance d changes depending on the position of the engaged portion (recess) with which an engaging portion engages. For example, when an equal distance ($\alpha$) increases every time a recess goes up by one step, the distance d is expressed by $d=di+\alpha(n-1)$, wherein di is an initial value corresponding to the first step (the lowest step) (n is a value corresponding to any one of the steps 1-8). In addition, the value of a may vary. For example, the higher a step, the smaller or the larger the increased amount. The position of the lower end portion of the shutter 103 coincides with the position of the upper face of the placing unit 201.

Figure 6A:
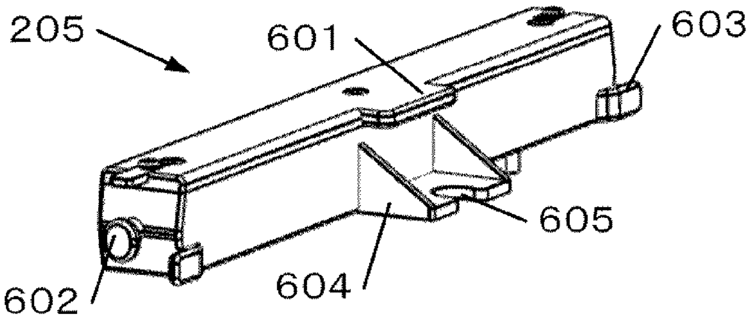
FIGS. 6A, 6B and 6C illustrate a configuration of a depression portion 205 and a rail 208 according to an embodiment, respectively.
Figure 6B:
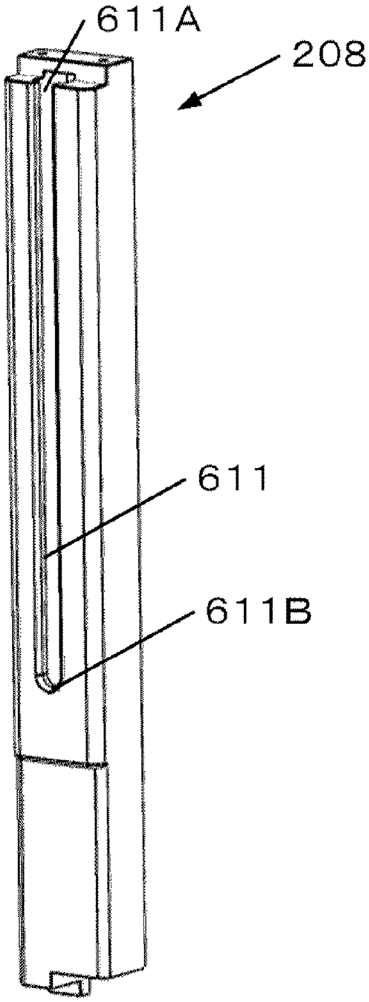
Figure 6C:
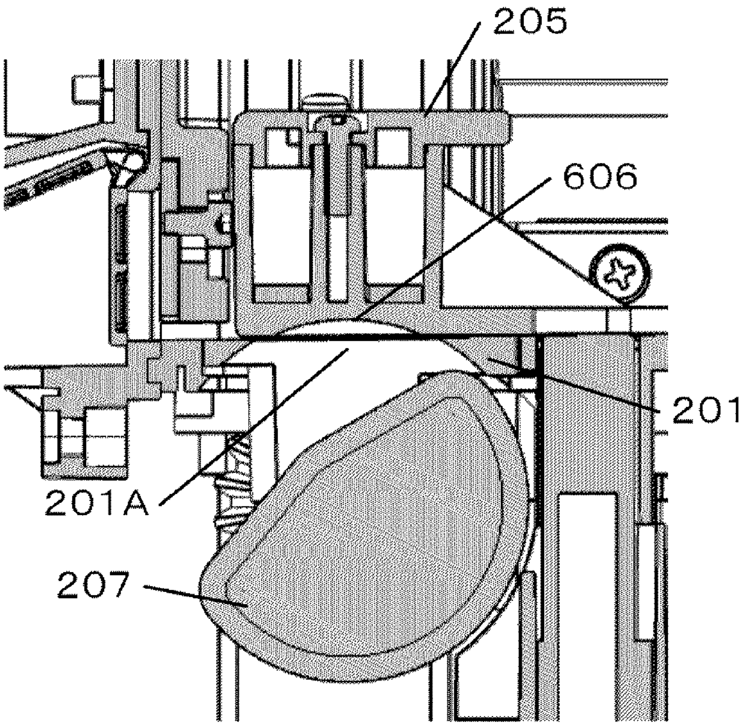

Next, the structure of the depressing portion 205 and the rail 208 will be explained, referring to FIGS. 6A-6C. FIG. 6A shows an example of an outer appearance of the depressing member 205. FIG. 6B shows an example of an out appearance of the rail 208. FIG. 6C is a sectional view of an example of the structure of the article accommodation unit 11 around the depressing portion 205.

The depressing portion 205 is a member extending along a width direction of an article(s) placed in the article accommodation unit 11 (or a width direction of the article accommodation unit 11), and depresses a front portion of the article(s) located on a side of the supply port 102 from an upper side of the article(s) when the article(s) is placed in the article accommodation unit 11. The depressing portion 205 depresses the front portion from the upper face side which is directly above the arranged roller 207, thereby pushing the article(s) toward the roller 207 so that a turning force of the roller 207 can be accurately transmitted to the article. The depressing portion 205 is configured so as to be movable in up and down directions along the rails 208L and 208R which are arranged left and right ends of the depressing portion 205. The depressing portion 205 can be detached from the rails 208 by operating an upper projection portion 601. Engaging portions 602 are formed at both ends of the depressing portion 205, and when the engaging portions 206 engage with the cutouts 611 of the rails 208, the position of the depressing portion 205 is determined. The cutout 611 has an open end 611A on an upper side thereof, and an end portion 611B on a lower side thereof. The engaging portion 602 is inserted from the open end 661A so that the depressing portion 206 may naturally drop along the cutout portion 611 due to its own weight. The depressing portion 205 is located at the lowest point thereof when the engaging portion 602 reaches the end portion 611B.

The depressing portion 205 has, on a lower portion thereof, a protection member 604 for protecting the switch 204. The protection member 604 functions to prevent an operation from the outside through the supply port 102 from being performed when the switch 204 is projected to an upper side thereof in case where there is no article in the article accommodation unit 11. The protection member 604 has a holding portion 605, and the switch 204 is positioned within the holding portion 605, thereby holding the switch 204. By this configuration, it is possible to prevent the switch 204 from being broken down by operating the switch from the outside. The projection portions 603 are brought into contact with the rails 208 and reduce a load applied to the engaging portion 602 in the front and rear directions of the article accommodation unit 11, thereby preventing brokage of the engaging portion 602.

In addition, as shown in FIG. 6C, a convex portion 606 is formed on a bottom portion of the depressing portion 205 so as not to interfere a rotation of the roller 207. The shape of the concave portion 606 is not limited as long as it does not interfere with a rotation of the roller 606, for example, the shape pay be a circumferential depression along the rotation of the roller. In addition, the concave portion 606 is formed in only a portion where the roller 606 is arranged. In addition, the surface of the concave portion 606 forms a plane connected to the opening portion 201A provided in the placing unit 201.

Figure 7A:
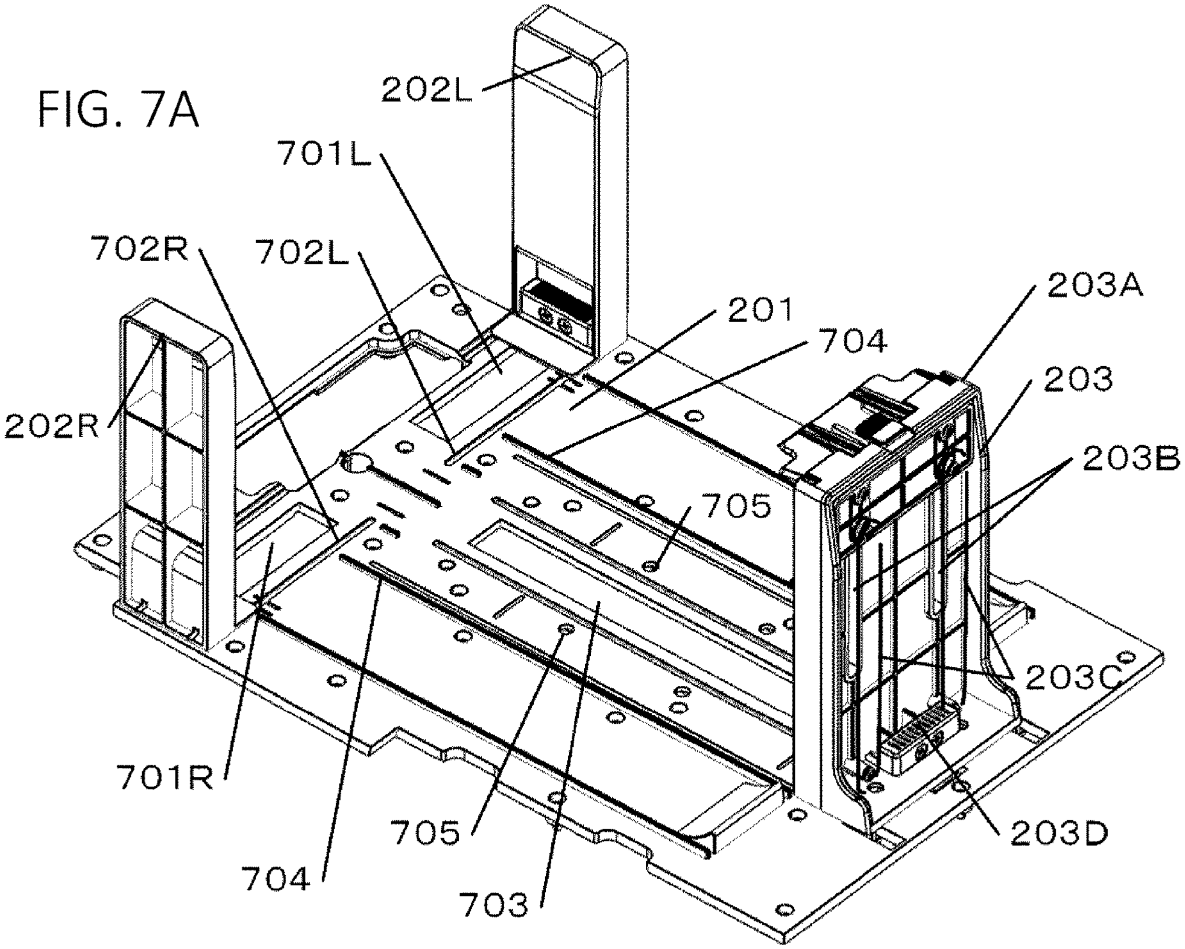
FIGS. 7A and 7B illustrate a configuration of a first holding portion 202 and a second holding portion 203 according to an embodiment, respectively.

Next, a mechanism of the first holding portion 202 and the second holding portion 203 which hold an article(s) placed on the placing unit 201 will be explained referring to FIGS. 7A and 7B. FIG. 7A shows a state where the first holding portions 202L and 202R and the second holding portion 203 are respectively arranged on the placing unit 201. The first holding portions 202L and 202R can be moved in a width direction of the article accommodation unit 11 along openings 701L and 701R formed on the placing unit 201 and rails 702L and 702R. The second holding portion 203 can be moved in a depth direction of the article accommodation unit 11 along an opening 703 and a rail 704 formed on the placing unit 201.

The first holding portions 202L and 202R and the second holding portion 203 have a lock mechanism for stopping them at respectively predetermined positions, so stop positions corresponding to the sizes of the articles may be assigned thereto in advance. The openings 705 formed on the placing unit 201 are used to determine the position of the second holding portion 203. The second holding portion 203 may be fixed to and supported by the placing unit 201 by attaching lock members for the second holding portion 203 to the second holding portion 203 through the openings. The two or more openings 705 may be formed at positions corresponding to the lengths in the depth direction of articles along the long side of the opening 703. By this configuration, the second holding portion 203 can be fixed to the placing unit 201 through the respective openings 703 by using the lock members. The projection portion 203D is a member for releasing the lock state caused by the lock member. When the projection portion 203 is pushed thereinto, the lock member engaged with the opening 705 etc. is pushed down in a lower side thereof, so that the lock may be released. The lock member is biased in a direction of the second holding portion 203 by a spring etc. and when press of the projection 203D is released at a position where an opening is formed on the placing unit 201, the lock member engages with the opening by the biasing force so that a stop position of the second holding portion 203 can be fixed. Such a mechanism comprising the lock members and the projection portion 203D etc. can be adopted for the first holding member 202 in a similar manner.

In FIG. 7A, a projecting portion 203A is arranged at a tip of the second holding portion 203. The projecting portion 203A is configured so as to be movable in up and down directions along an opening 203B formed in the second holding portion 203. The opening 203B is formed from the upper end of the second holding portion 203 to the height as high as approximately the middle thereof so that the projecting portion 203A cannot move in lower side beyond that. In addition, elastic bodies 203C are attached to a back side of the second holding portion 203, and the clastic force of the elastic bodies is applied to the projecting portion 203A so that the projecting portion 203A is pushed down toward the lower side. The elastic force is applied to an upper face of the articles laminated on the placing unit 201 through the projecting portion 203A so that the upper face is pushed down toward a lower side. The elastic force may be applied in a range in which the second holding portion 203 moves within the opening 203B or in part of the range. At that time, when the height of the laminated articles is higher than a predetermined value, for example, when it is higher than a lower end portion of the opening 203B, it is pushed down below the projecting portion 302A. Since the projecting portion 203A pushes down the laminated articles from the back side, it is possible to accurately transmit a turning force of the roller 207 to the articles while the depressing portion 205 achieves balancing between that and the pushing of the front of the article. The elastic body may be, for example, rubber or spring as long as such an elastic force can be generated.

The projecting portion 203A may be in an approximately hexagonal shape which can be formed by cutting out a top portion of a rectangular shape on a front side of the article accommodation unit 11. Or, the projecting portion may be elliptic, semicircular or a semi-elliptic or other shape. In addition, the projecting portion 203A has a shape where a length in a width direction is longer than that in the depth direction, and is configured so as to press at least part of a back side of articles laminated on the placing unit 201.

Figure 7B:
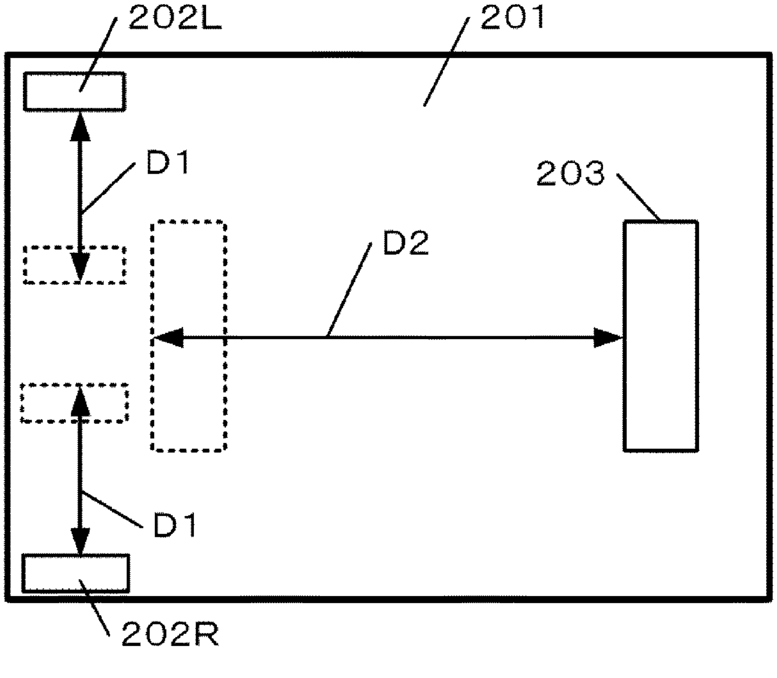

FIG. 7B illustrates a movable range of the first holding portions 202 and the second holding portion 203 on the placing unit 201. The movable range of the first holding portions 202 is shown in an arrow D1, and the movable range of the second holding portion 203 is shown in an arrow D2, wherein a relation D2>D1 is established.

Figures 8A, 8C:
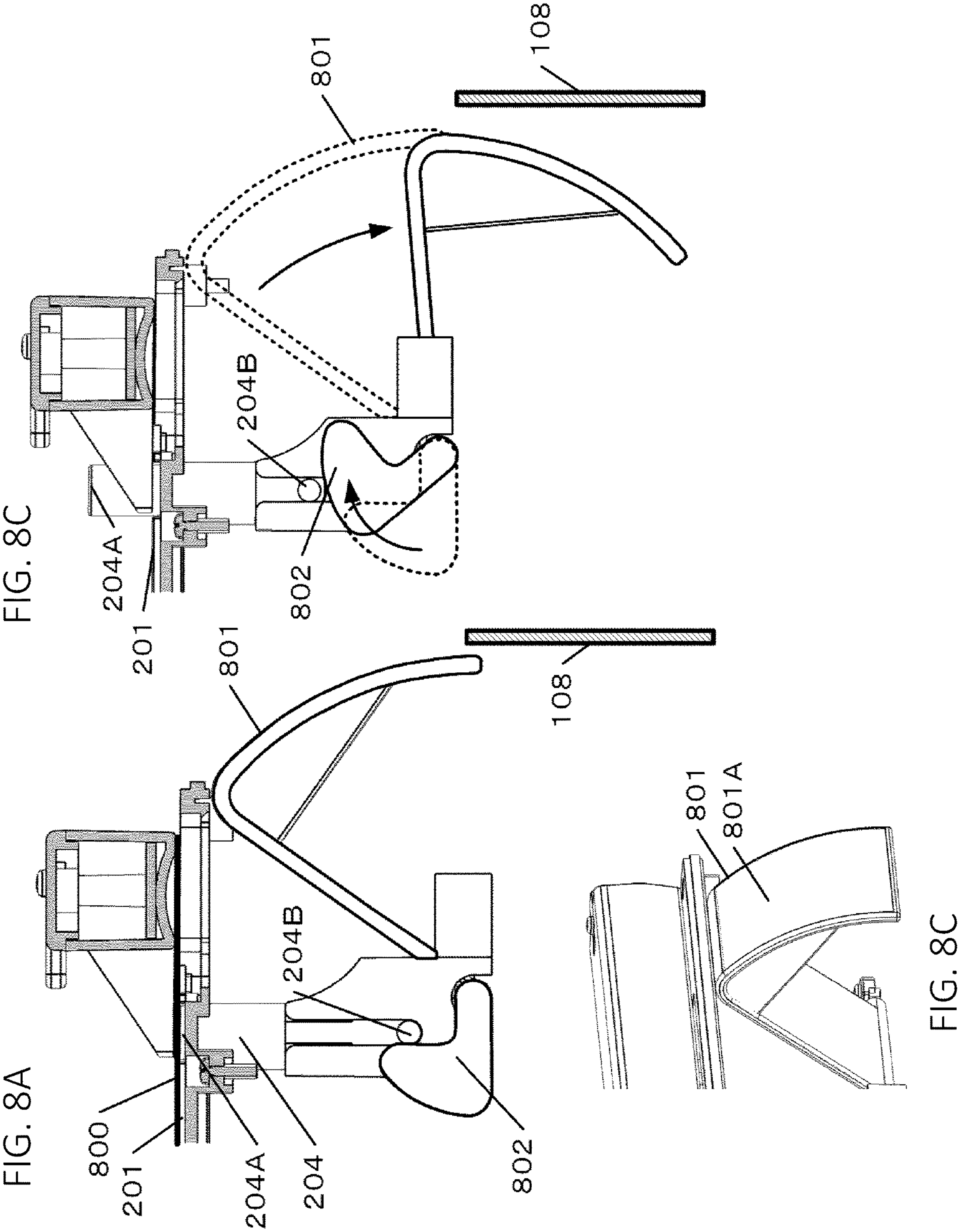

Next, an interlocking mechanism between the detection of the presence of an article by the switch 204 and a notification in the notification portion 108 will be explained referring to FIGS. 8A and 8B. FIG. 8A shows a state of the article accommodation unit 11 in case where an article is present in the article accommodation unit 11. At this time, since the switch 204 is biased toward an upper side, but pressed toward a lower direction by the article 800, the notification display unit 801 is not visible from the outside in the notification portion 108. At this time, the tip portion 204A of the switch 204 is located in the same plane as that of the placing unit 201. The notification display unit 801 is connected to an L-shaped member 802 which is in contact with a projection portion 204B of the switch 204 through a rotational axis, and the L-shaped member 802 is biased by a spring etc. so as to rotate in a clockwise direction in FIG. 8A. The rotation of the L-shaped member and the notification display unit 801 which is interlocked with the L-shaped member 802 is suppressed by the projection portion 204B of the switch 204.

On the other hand, as shown in FIG. 8B, when the articles 800 run out and the pressing force exerted toward a lower side by the articles is released, the tip portion 204A of the switch 204 projects into an upper side of the placing unit 201 according to the upward biasing force so that the projection portion 204B, which restrains the rotation of the L-shaped member 802, also moves toward the upper side. By this configuration, the L-shaped member 802 is rotated in a direction shown in an arrow, and accordingly the notification display unit 801 is also rotated downwardly. By this configuration, a message region 801A of the notification display unit 801 shown in FIG. 8C becomes visible from the outside through the notification portion 108. The notification portion 108 comprises a member made of a transparent plastic or glass etc. so that a user can visibly recognize the message region 801A from the outside through the member.

Figure 9A:
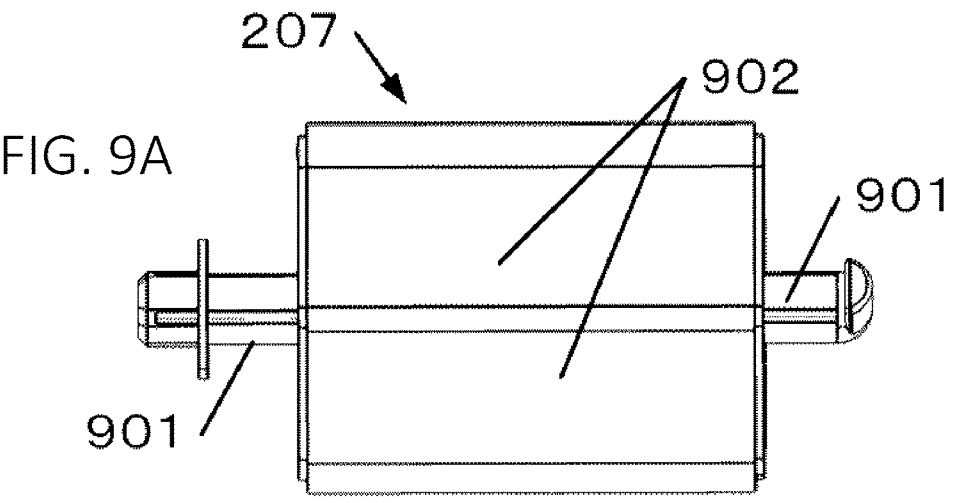
FIGS. 9A, 9B and 9C illustrate a configuration of a roller 207 according to an embodiment, respectively.
Figure 9B:
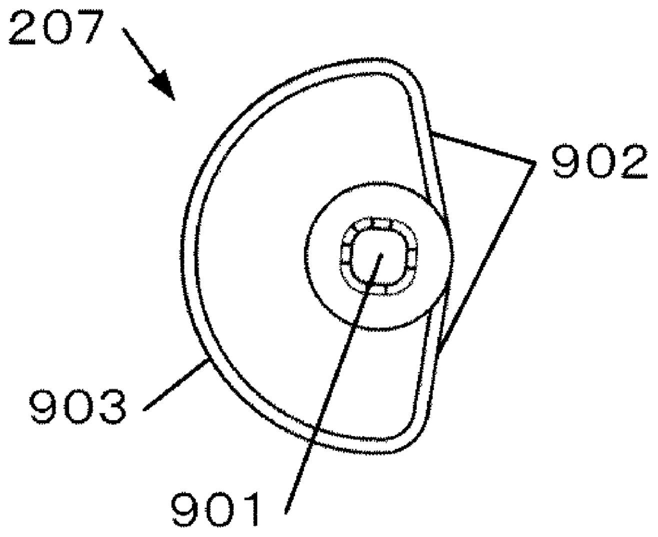
Figure 9C:
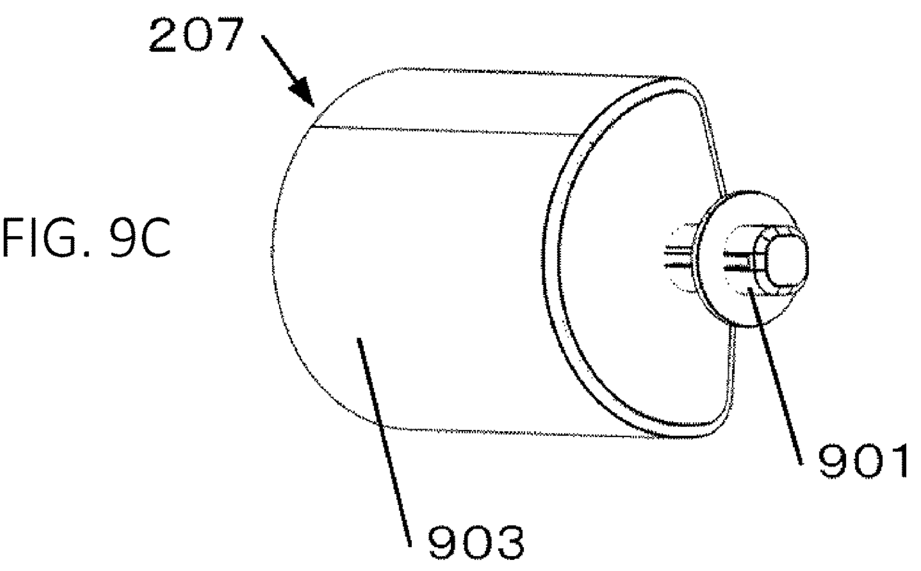

Next, the structure of the roller 207 will be explained referring to FIGS. 9A, 9B and 9C. The roller 207 functions as a transmission unit which can transmit an article accommodated in the article accommodation unit 11 to the supply port 102. FIGS. 9A through 9C show an example of a configuration of the roller 207. FIG. 9A is a front side view of the roller 207. As shown in the figure, a rotation axis 901 is projected leftward and rightward from the respective sides of the roller 207. The roller 207 rotates with respect to the rotation axis 901. The rotation axis is interlocked with the handle 104 through a certain mechanism, so that when the handle 104 is rotated by one revolution, the roller 207 is also rotated by one revolution with respect to the rotation axis 901. A flat face portions 902 are formed on a surface of the roller 207 along the rotation axis 901 wherein the flat face portions 902 will not be brought in contact with an article to be sent out when the roller 207 is rotated.

FIG. 9B is a side view of the roller 207, wherein a curved face portion 903 is formed on a back side of the flat face portions 902 of the roller 207. The roller 207 has a shape like a partially cut-out portion which is formed by removing an outer face of a cylinder. The removed portion corresponds to the flat face portion 209, and the remaining semi-cylinder portion corresponds to the curved face portion 903. In addition, regarding the ratio of the cur-out portion and the remaining portions, the remaining portion is larger than the cur-out portion. In addition, the area of the curved face portion 903 is larger than that of the flat face portions 902.

FIG. 9C shows a back face of the roller 207, wherein the curved face portion 903 of the roller 207 is brough in contact with an article and functions to transmit the article to the supply port 102. It is desired that the curved face portion 903 is covered with grippy material on its surface, such as soft material like rubber etc. or slip resistance material in order to transmit a turning force to the article when the curved face portion 903 is brought in contact with the article. However, the entire curved face portion is not necessarily covered with such soft material and at least part thereof should be covered therewith. As to the range of the at least part of the curved face portion, while the curved face portion 903 in a circumferential direction may be entirely covered with such material, the curved face portion 903 in a width direction may be discontinuously covered therewith. The curved face portion 903 in the circumferential direction may be not necessarily continuously covered therewith but may be entirely covered with two or more soft material members.

Figure 10:
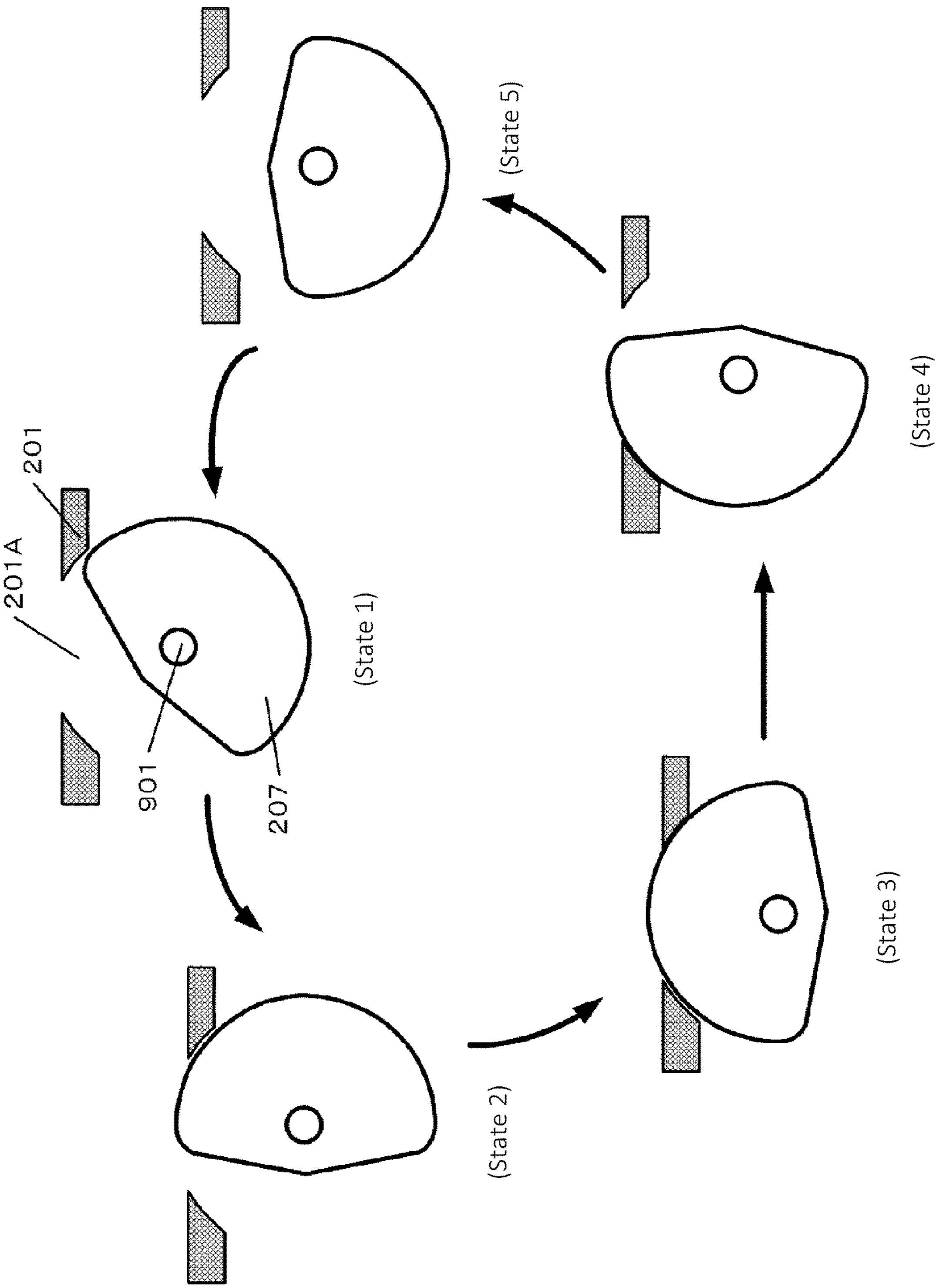
FIG. 10 is a diagram illustrating a relation between an opening portion 201A of a placing unit 201 and a roller 207 according to an embodiment.

As shown in FIG. 6C, an opening portion is formed near the supply port 102 in the placing unit 201, and a turning force of the roller 207 is transmitted to the article by bringing the roller 207 and an article in contact with each other through the opening portion, so that the article can be sent out to the supply port 102. FIG. 10 illustrates a relation between the opening portion and the roller 207.

FIG. 10 is a state transition diagram showing the relation between rotation position of the roller 207 and placing unit 201. A state 1 shows an initial position of the roller 207 when the roller 207 starts a rotation. In a state at the initial position, the roller 207 does not project from the opening portion 201A of the placing unit 201. After that, the roller 207 rotates counterclockwise with respect to the rotation axis 901 in FIG. 10, and at least part of the roller 207 projects from the opening portion 201A, and the roller 207 is brought into contact with the article placed on the placing unit 201, from an end of on the right side thereof, so that the article is pushed out toward a front side of the article accommodation unit 11. In this way, the state 2 where the curved face portion 903 of the roller 207 projects from the opening portion 201A shifts to the state 4 through the states 2 and 3. In this period, the curved face portion 903, which projects from the opening portion 201A, is brought into contact with the article, so that a force for pushing an article toward the front side is exerted. In the state 2 through the state 4, the roller 207 is in "a transmittable state." After an end of the left side of the roller 207 is brought into contact therewith in the state 4, the roller 207 is not in contact with the article as shown in the state 5. That is, only the curved face portion 903 projects from the opening portion 201A and is brought into contact with the article and the flat face portions 902 does not project therefrom so that it is not brought into contact with the article. During the period from the state 5 to the state 1, the roller 207 is in a transmission incapable state". In this state, although the position of the article does not move, the article is exposed to the outside enough to the extent that the article can be taken out from the supply port 102. The user can take out the article from the article accommodation unit by pulling out a portion thereof which is exposed from the supply port 102.

Figure 11:
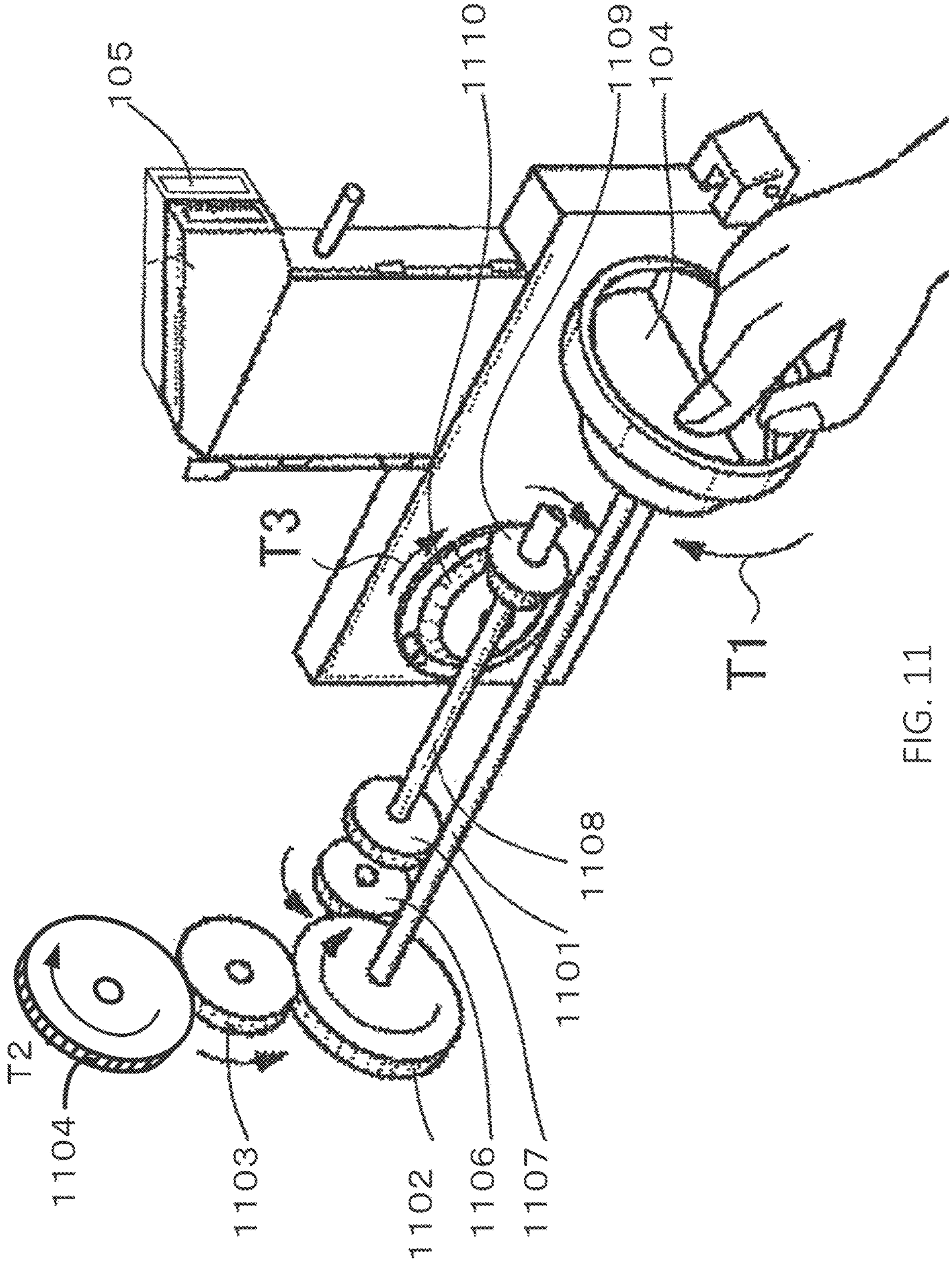
FIG. 11 is a diagram illustrating a power transmission mechanism on a side of a main body 11 for transmitting a power corresponding to an operation to a handle 104 according to an embodiment.

Next, a power transmission system for transmitting a power according to an operation performed to the handle 104 will be explained referring to FIG. 11. FIG. 11 is a schematic view for illustrating the power transmission system. In FIG. 11, an end of a main shaft body 1101 which forms part of gear interlocking mechanism, is attached to a rotational central axis of the handle 104. A spur gear 1102 is fixed to the other end of this main shaft body 1101. A pinion 1103 which meshes with the spur gear 1102 is rotatably journalled above the spur gear 1102. Above the pinion 1103, a spur gear 1104 which meshes with the pinion 1103 is journalled at a lower end of a back face of the article accommodation unit 11. Thus, a power corresponding to an operation performed to the handle 104 is transmitted to the article accommodation unit 11 through the pinion 1103.

Therefore, a turning force is transmitted to the spur gear 1102 through the main shaft body 1101 when the handle 104 is manually rotated by one revolution in a direction of an arrow T1, and the turning force is transmitted to the spur gear 1104 through the pinion 1103 which meshes therewith in a direction f an arrow T2. And when the operation to the handle 14 is continued, the spur gear 1104 is rotated by one revolution.

In addition, diagonally below the spur gear 1102, a spur gear 1106 which meshes with the spur gear 1102 is rotatably journaled. Below the spur gear 1106, an intermediate shaft 1108 is rotatably journaled, wherein a pinion 1107 meshing with the spur gear 1106 is attached to one end of the intermediate shaft 1108. A bevel gear 1019 is attached to an end of the intermediate axis 1108. When a user rotates the handle 104, the main shaft body 1101 is rotated whereby the spur gear 1102 is rotated. In this configuration, on one hand, this rotates the pinion 1103 and the spur gear 1104. In addition, on the other hand, the intermediate shaft 1008 is rotated via the spur gear 1106 and the pinion 1107 by the rotation of the spur gear 1102 thereby rotating the bevel gear 1109. Therefore, if the rotation of the bevel gear 1109 is restricted, the rotation of the handle 104 and that of the spur gear 1104 is also restricted.

A bevel gear 1110 meshes with the bevel gear 1109. Therefore, when the bevel gear 1109 is rotated by rotation of the handle 104, the bevel gear 1110 is also rotated. However, as described above, the bevel gear 1110 is integrated with the rotation portion 113. Here, as described above, the rotation portion 113 is a mechanism for releasing the lock of the handle 104 in response to a detection of insertion of a coin(s) equivalent to a predetermined amount of money by the consideration payment detection portion 112, and when the predetermined amount of money has not been inserted, the rotation portion 113 is locked. In this case, the bevel gear 1110 and the bevel gear 1109 cannot be rotated, so that the rotation of the handle 104 is prevented. Thus, in the state where the rotation portion 113 is locked, rotation of the bevel gear 1109 and bevel gear 1110 is also prevented and the handle 104 cannot be rotated, so that the spur gear 1104 does not rotate and any article cannot be taken out. On the other hand, when the consideration payment detection portion 112 detects that the predetermined amount is dropped, the lock of the rotation portion 113 is released and an operation of the handle is allowed, so that the bevel gear 1110 and the bevel gear 1109 are rotated according to an operation of the handle 104 and the spur gear 1104 is rotated.

In FIG. 11, the main shaft body 1101 to which the handle 104 is directly connected, and the intermediate axis 1108 to which the bevel gear 1109 interlocked with the rotation portion is attached, are separately provided. However, the bevel gear 1109 may be provided to the main shaft 1101.

Next, the power transmission system provided in the article accommodation unit 11 for transmitting a power according to an operation performed to the handle 104, referring to FIGS. 12A-12D. FIG. 12A is a diagram showing a configuration of an example of a transmission system. In the transmission system, when the lock of the switch 1201 is released and the spur gear 1104 provided on a back wall of the article accommodation unit 11 is rotated, a turning force is transmitted to the roller 207 through the spur gear 1202, the main shaft body 1203, the bevel gears 1204 and 1205 and the intermediate axis 1206.

In the transmission system shown in FIG. 12A, the switch 1201 functions as a lock portion for performing control as to whether the spur gear 1104 shown in FIG. 11 can be rotated. When the article accommodation unit 11 is attached to the article supply device 10 and is brought into contact with a back wall of the article supply device 10, the projection 1201 is pressed so that the engagement state (contact state) of the projection of the tip portion of the switch 1201 (1201D in FIG. 12C) and the spur gear 1104 is released, so that the spur gear 1104 becomes rotatable. Further, as shown in FIG. 12D, a concave portion 1104B which engages with the projection 1201D provided at the tip portion of the switch 1201 is formed on a side face portion of the spur gear 1104, where no tooth is not formed. The switch 1201 is configured so as to be swingable with respect to an axis 1201A. And, the switch 1204 is biased in a first direction shown in an arrow by the bias portion 1201B, and the projection 1201D of the tip portion of the switch 1201 is activated through the axis 1201A by the bias force in a direction in which the spur gear 1104 is locked. Therefore, when it is not brough into contact with the back wall of the article supply device 10, the projection 1021D engages with the spur gear 1104 by the bias force generated by the bias portion 1201B, so that a rotation operation of the spur gear 1104 is restrained. Further, a projecting direction of the projection 1201C of the switch 1201 is also the first direction. The projection 1201D of the switch 1201 projects in a second direction opposite to the first direction.

The spur gear 1104 engages with the spur gear 1202 and a power from the handle 104 is transmitted to the main shaft body 1203. In FIG. 12A, a middle part in the length of the main shaft body 1203 is omitted. The rotation of the main shaft body 1203 is transmitted to the roller 20 through the bevel gear 1204 and 1205 and the intermediate axis 1206. Thus, the rotation of the handle 104 can be transmitted to the roller 207. Although the spur gears 1104 and 1202 are covered by a cover 1207, since the spur gear 1104 engages with the pinion 1103, part of the spur gear 1104 is exposed to the outside of the cover 1207. The cover 1207 protects the spur gears 1104 and 1202 so as not to interfere with the rotation by bringing the spur gears 1104 and 1202 into contact with an inner side of the back wall of the article supply device 10.

Next, FIG. 12B is a diagram showing a state where the spur gear 1104 and the spur gear 1202 engage with each other, wherein a mark 1104A shown on the spur gear 1104 and a mark 1202A shown on the spur gear 1202 face each other at corresponding positions. In the present embodiment, as explained in FIGS. 9A-9C and 10, since the roller 207 has the shape in which part of a cylinder is cut out, it is necessary to correctly determine the rotation start position of the roller 207 so that the article and the curved face portion 903 are correctly brought into contact with each other when the roller 207 is rotated. If the curved face portion 903 and the article are not correctly brought into contact with each other, there is possibility that the article is not discharged from the article supply port 102. Therefore, in the present embodiment, the state where the mark 1104A and the mark 1202A face each other and the rotation start position of the roller 207 are associated with each other, and the article accommodation unit 11 is attached to the article supply device 10 in a state shown in FIG. 12B, that is, in a state where the rotation of the spur gear 1104 is locked by the switch 1201. While the switch 1201 performs a function for fixing the rotation start position of the roller 207, since the state of engagement with the spur gear 1104 is released at the time of the attachment, any operation will not be prevented after that.

When the article accommodation unit 11 is not attached to the article supply device 10, the rotation position of the spur gear 1104 can be changed by manually and arbitrarily rotating the spur gear 1104. Therefore, when the article accommodation unit 11 is re-attached to the article supply device 10 after the article accommodation unit 11 is detached from the article supply device 10, it is possible to certainly discharge the article from the article supply device 10 without any false operation by manually rotating the spur gear 1104 by adjusting the rotation positions of the spur gears 1104 and 1202 so that the mark 1104A and the mark 1202A face each other.

When the spur gear 1104 is located at the position shown in FIG. 12B (a first position), the switch 1201 is arranged so as to engage with the concave portion 1104B of the spur gear 1104. The concave portion 1104B has a concave depth enough to engage with the projection 1201D of the switch 1201. When the spur gear 1104 is located at the first position, a lock operation can be done by the switch 1201. However, when it is located at a position other than the first position (a second position), since the concave portion 1104B of the spur gear 1104 and the switch 1201 do not engage with each other, a lock operation becomes possible.

The present invention is not limited to the above-described embodiments, and various modifications and changes are possible within a scope of the gist of the invention.

The invention claimed is:

1. An article accommodation unit which can be attached to an article supply device, comprising:

a main body configured to accommodatie articles in a state where the articles are laminated;

an operation portion provided in the main body; and a lock portion provided in the main body and including:

a first projecting portion which projects in a first direction from one end portion thereof, a second projecting portion which projects in a second direction which is different from the first direction from another end portion thereof, and a biasing portion configured to bias the second projecting portion toward the operation portion such that the second projecting portion is brought in contact with the lock portion by a biasing force of the biasing portion thereby locking the operation portion, when no force is exerted on the first projecting portion, wherein the second projection portion of the lock portion is configured to move away from the operation portion against the biasing force, thereby releasing a lock of the operation portion when the article accommodation unit is attached to the article supply device and the first projecting portion is brought into contact with an inner wall of the article supply device such that the force is exerted on the first projecting portion.

2. The article accommodation unit according to claim 1, wherein the operation portion is configured to perform an operation on a condition that payment of consideration for an article is detected by a detection unit which is provided in the article supply device and is configured to detect the payment of consideration for the article, and that an operation to the operation portion provided in the article supply device is performed to transport the article from the article accommodation unit.

3. The article accommodation unit according to claim 1, wherein the operation portion is configured to perform a rotation operation thereof as a predetermined operation.

4. The article accommodation unit according to claim 1, wherein the article accommodation unit is configured to be attachable to the article supply device and configured to be drawn toward a front side of the article supply device, and the operation portion is configured so as not to be in contact with the inner wall of the article supply device in a state where the article accommodation unit is attached to the article supply device.

5. The article accommodation unit according to claim 1, wherein at least part of the operation portion projects from a bottom portion of the main body.

6. The article accommodation unit according to claim 1, wherein the operation portion is a gear, and the lock portion is configured to be locked so that the gear does not rotate, on condition that a portion of the gear where the no tooth is formed is brought into contact with the second projecting portion.

7. The article accommodation unit according to claim 6, wherein part of teeth of the gear is configured so as to be exposed from the article accommodation device, the exposed teeth are configured to be interlocked with a power transmission unit, which is directly or indirectly connected to the operation portion provided in the article supply device, on condition that the article accommodation unit is attached to the article supply device.

8. The article accommodation unit according to claim 7, wherein, except for a portion of the exposed teeth, the gear is covered with a transparent or a semi-transparent member.

9. The article accommodation unit according to claim 1, wherein the main body further includes a transportation portion configured to transport the article accommodated in the main body, and the transportation portion is configured to transport the article on condition of an operation of the operation portion.

10. An article supply device comprising:

the article accommodation unit according to claim 9;

a reception unit which receives payment of consideration for the article;

a detection portion which detects the payment of consideration;

an operation portion which accepts an operation for transporting the article accommodated in the article accommodation unit in response to a detection of the payment of consideration; and a power transmission unit for transmitting a power of the operation to the transportation unit, and transporting the article.

* * * * *